March 24, 1959 H. HURWITZ, JR., ET AL 2,879,216
NEUTRONIC REACTOR
Filed Feb. 5, 1954 14 Sheets-Sheet 3

INVENTORS
Henry Hurwitz, Jr.
Harvey Brooks
Clifford Mannal
John H. Payne
Emmeth A. Luebke
By: Arland A. Anderson
Attorney

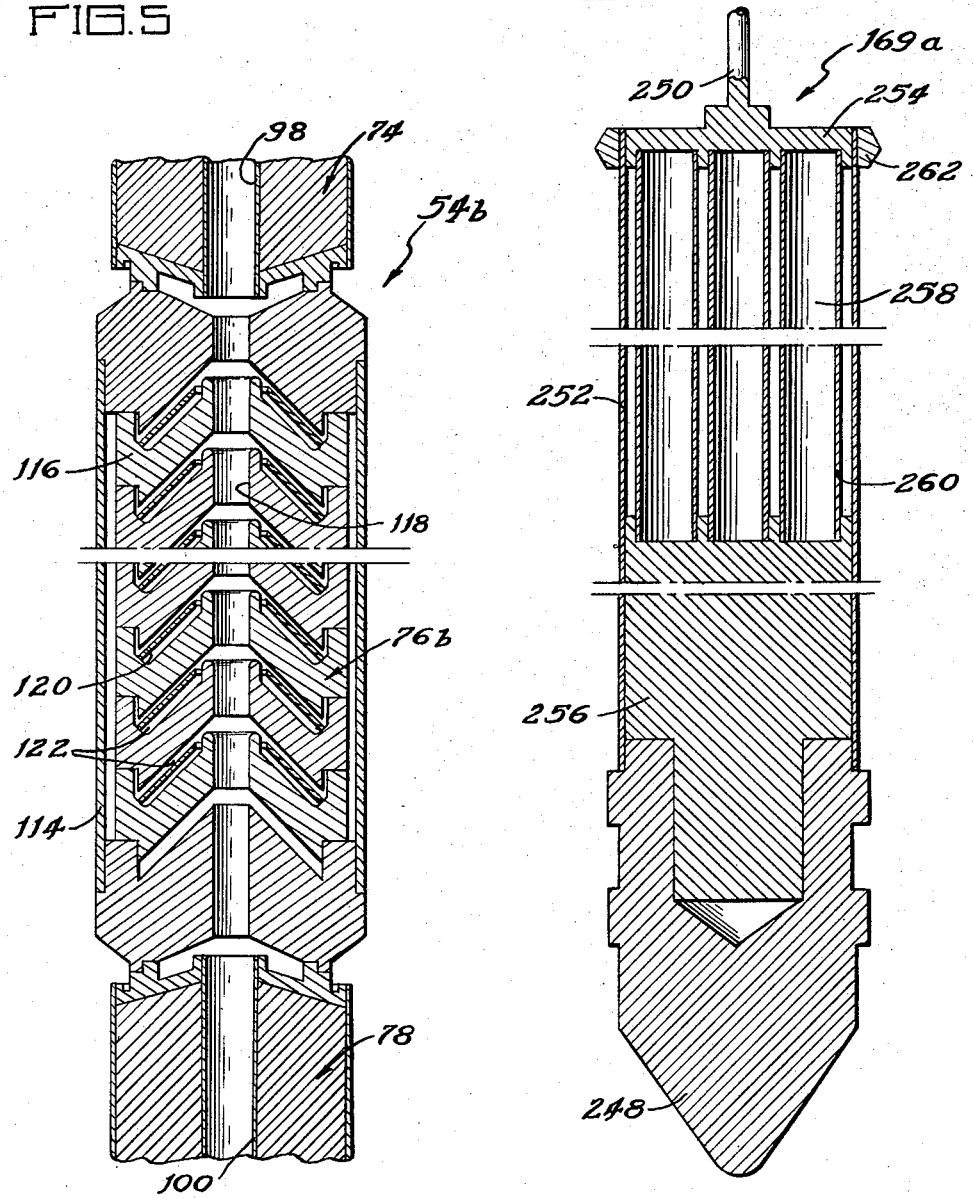

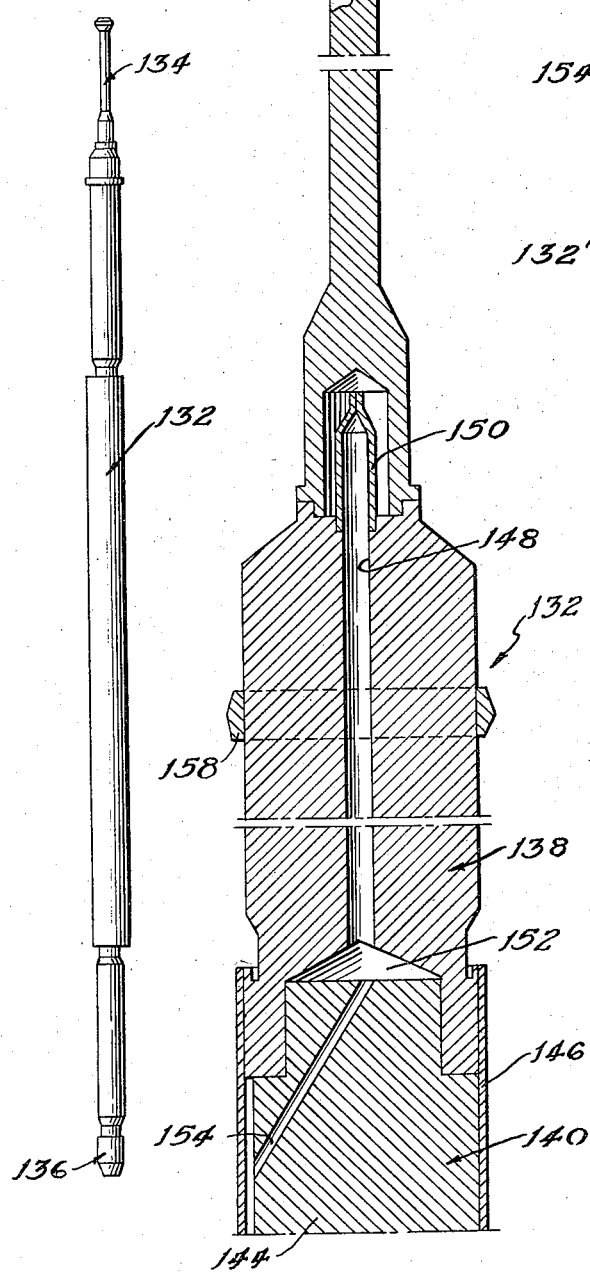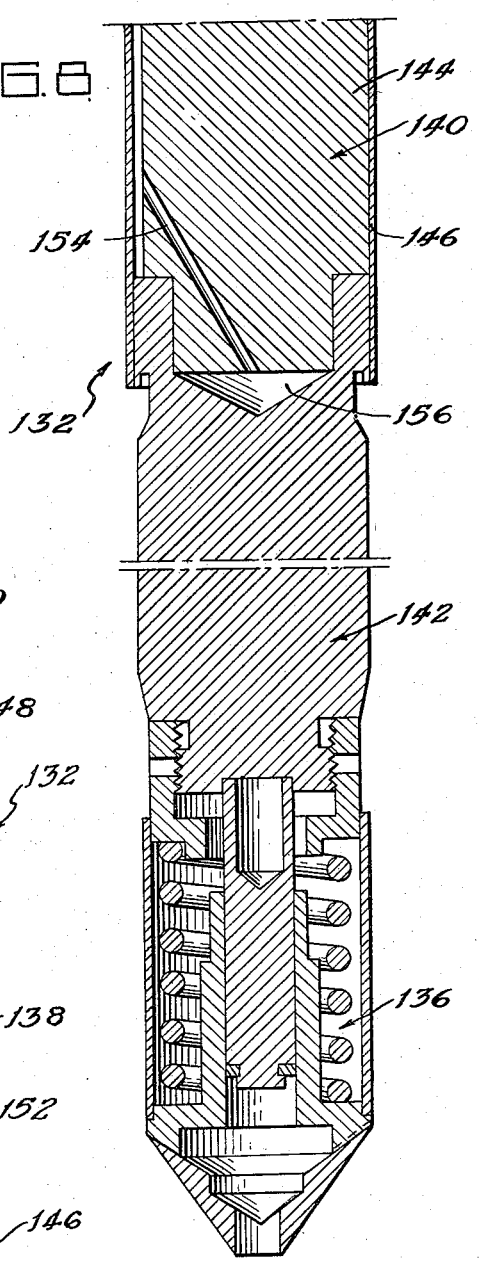

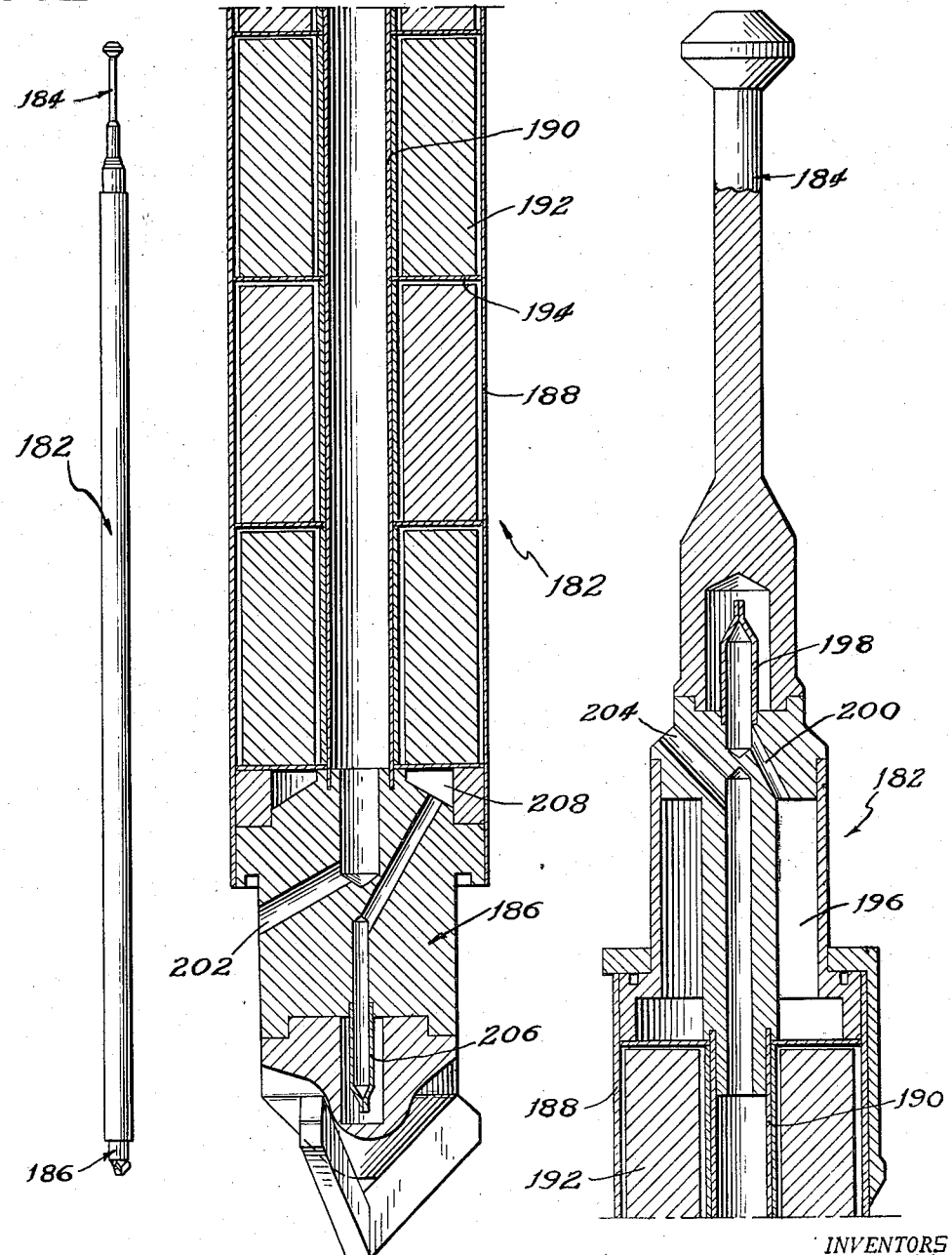

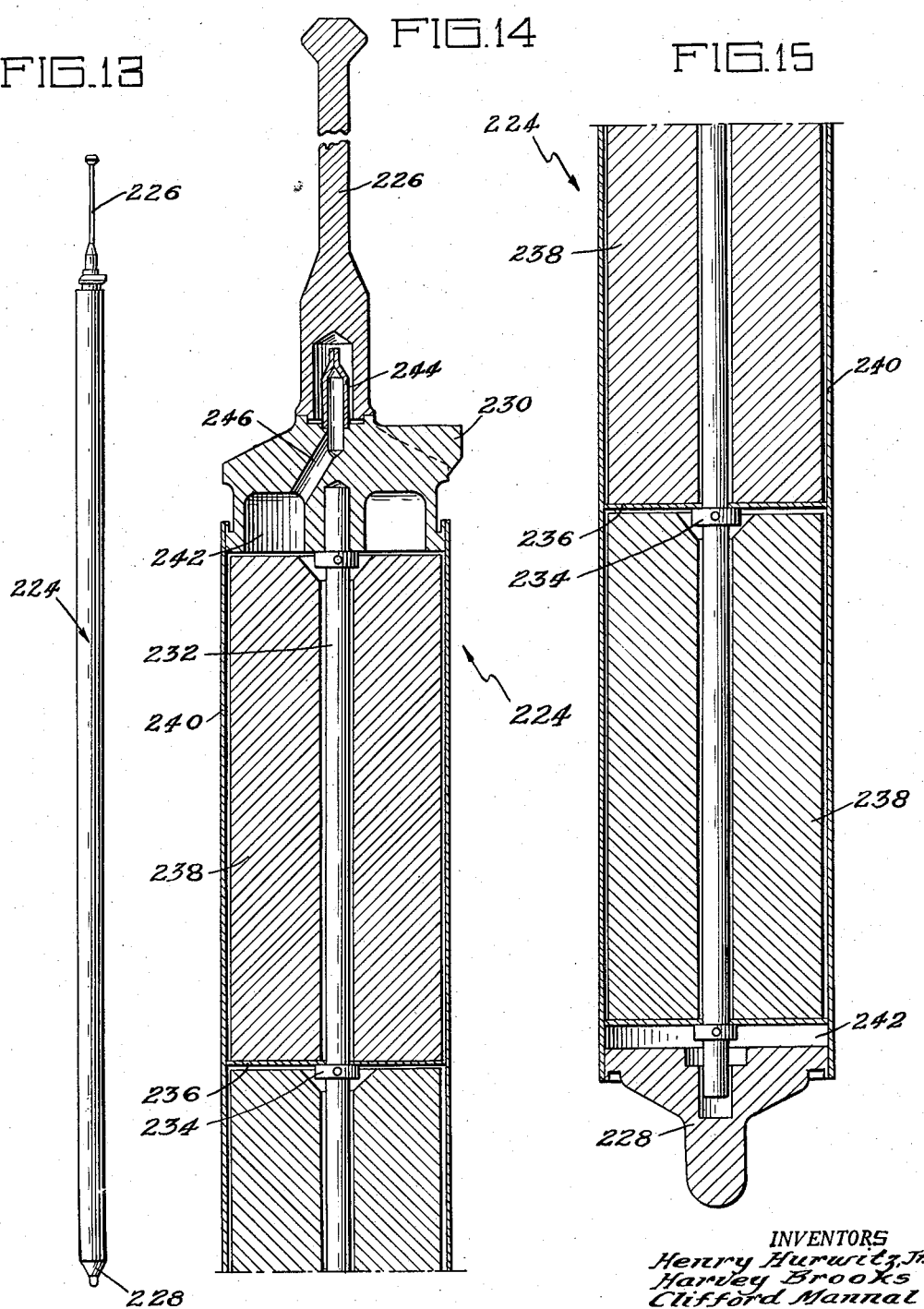

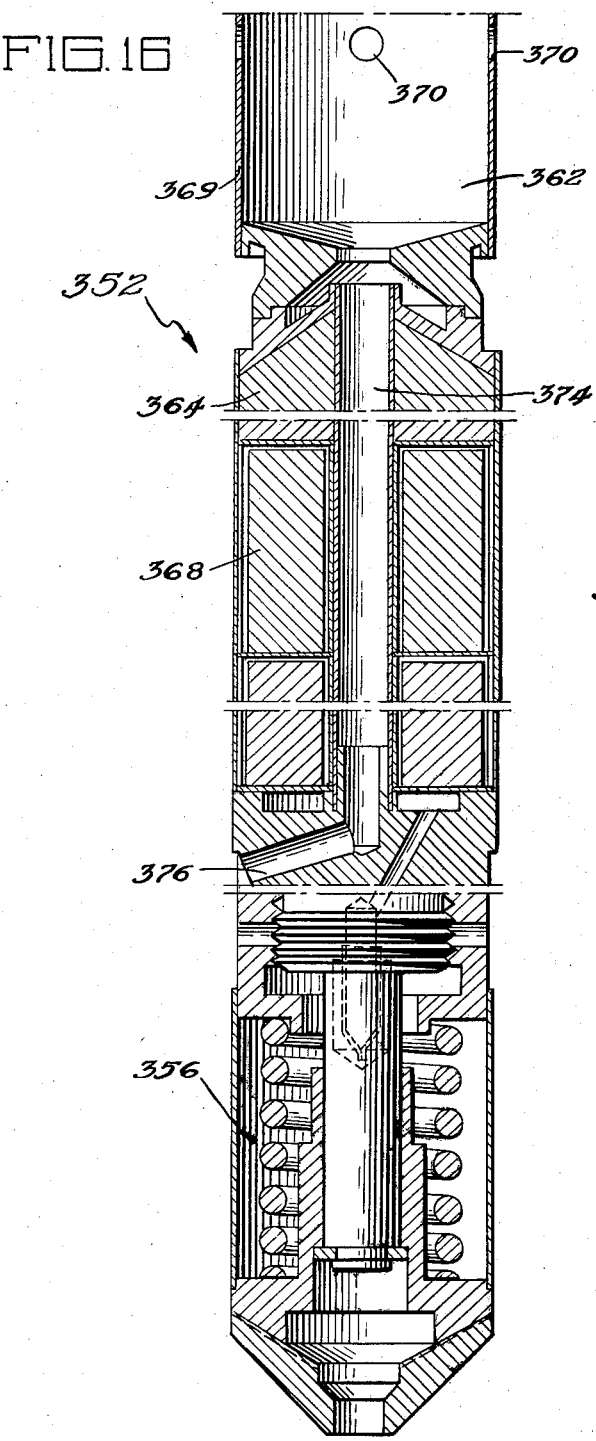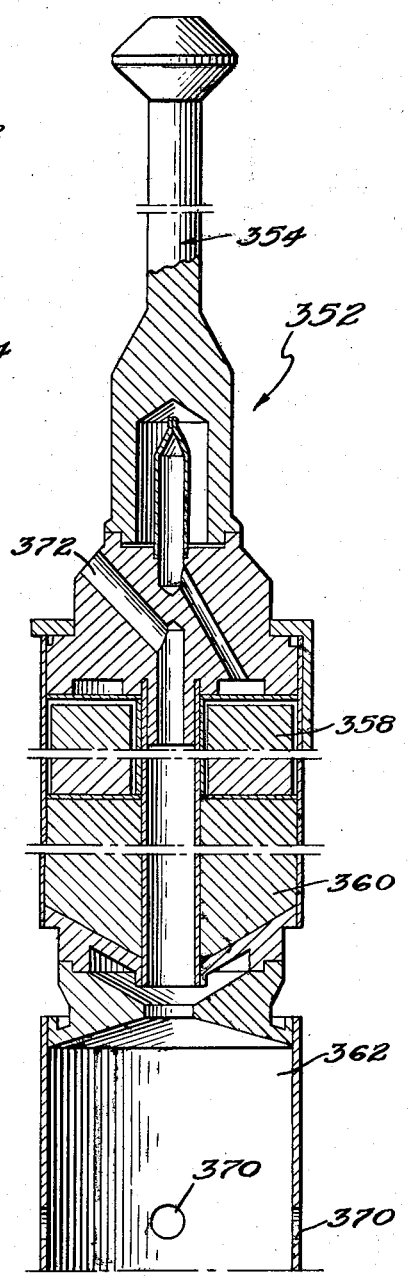
INVENTORS
Henry Hurwitz, Jr.
Harvey Brooks
Clifford Mannal
John H. Payne
Emmeth A. Luebke
By: Arland A. Anderson
Attorney

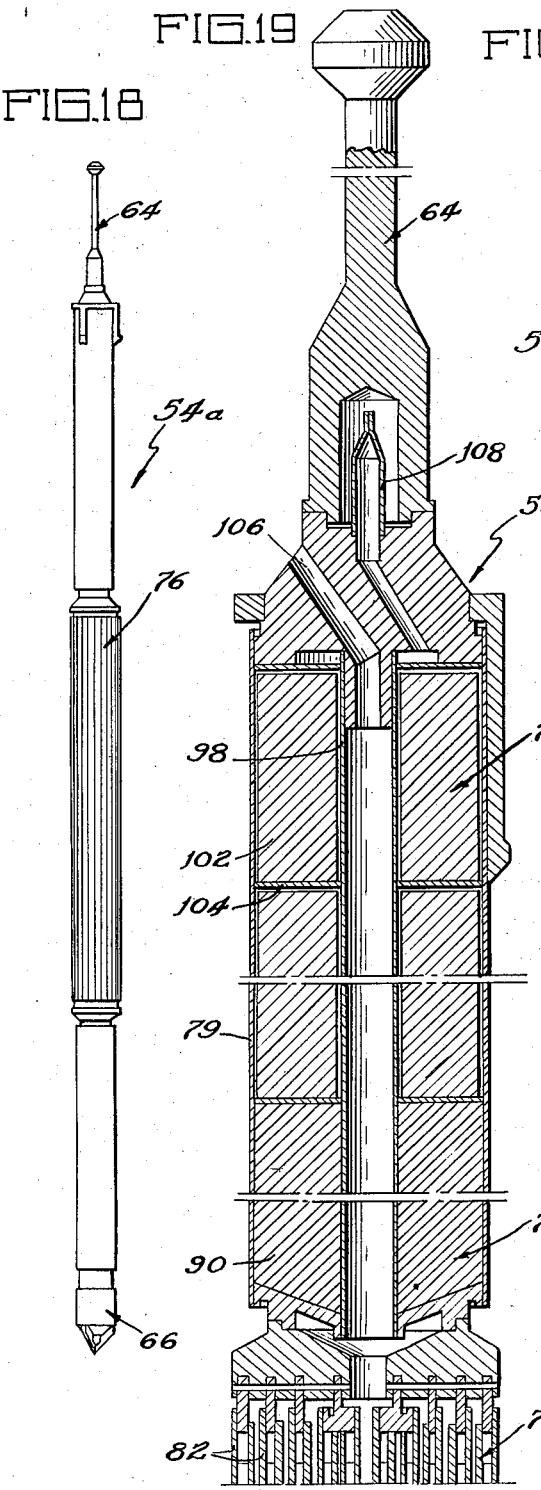

March 24, 1959  H. HURWITZ, JR., ET AL  2,879,216
NEUTRONIC REACTOR
Filed Feb. 5, 1954  14 Sheets-Sheet 10

INVENTORS
Henry Hurwitz, Jr.
Harvey Brooks
Clifford Mannal
John H. Payne
Emmeth A. Luebke
By: Roland A. Anderson
Attorney March 24, 1959 H. HURWITZ, JR., ET AL 2,879,216
NEUTRONIC REACTOR
Filed Feb. 5, 1954 14 Sheets-Sheet 11

INVENTORS
Henry Hurwitz, Jr.
Harvey Brooks
Clifford Mannal
John H. Payne
Emmeth A. Luebke
By: Attorney March 24, 1959  H. HURWITZ, JR., ET AL  2,879,216
NEUTRONIC REACTOR
Filed Feb. 5, 1954  14 Sheets-Sheet 12
FIG.28
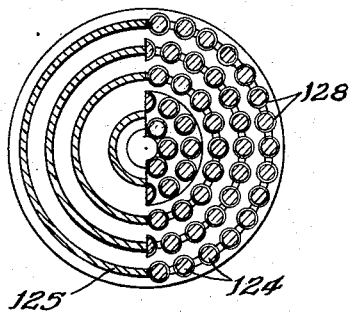
FIG.34
FIG.29
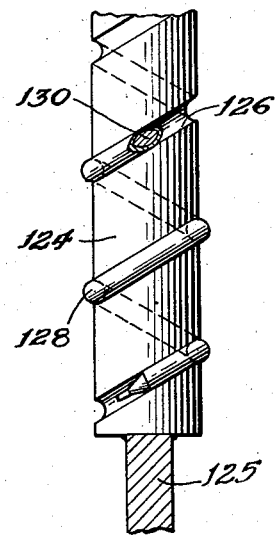
FIG.33
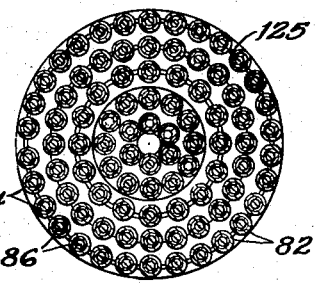
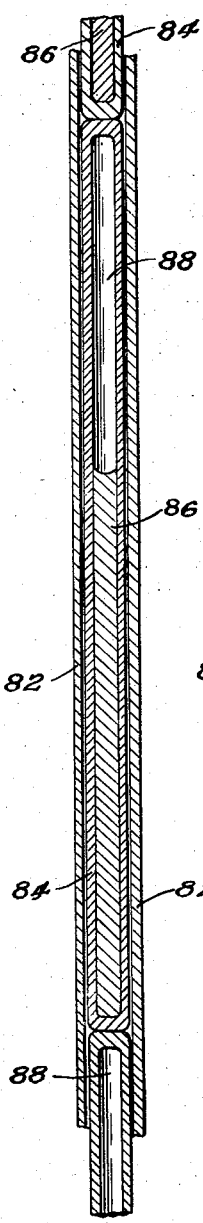
INVENTORS
Henry Hurwitz, Jr.
Harvey Brooks
Clifford Mannal
John H. Payne
Emmeth A. Luebke
By: Roland G. Anderson
Attorney INVENTORS
Henry Hurwitz, Jr.
Harvey Brooks
Clifford Mannal
John H. Payne
Emmeth A. Luebke
By: Roland A. Anderson
Attorney

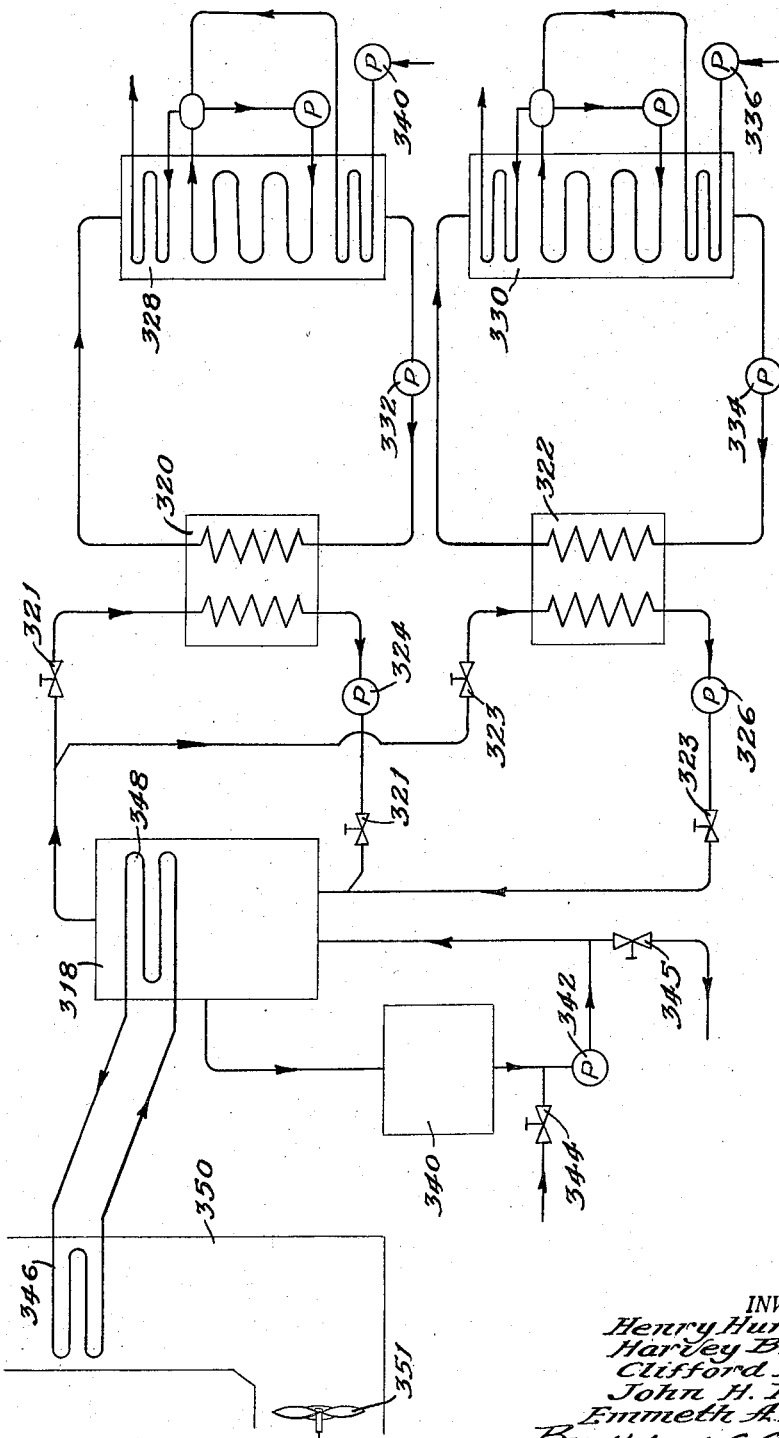

2,879,216

NEUTRONIC REACTOR

Henry Hurwitz, Jr., Schenectady, N.Y., Harvey Brooks, Cambridge, Mass., and Clifford Mannal, Schenectady, John H. Payne, Ballston Spa, and Emmeth A. Luebke, Schenectady, N.Y., assignors to the United States of America as represented by the United States Atomic Energy Commission Application February 5, 1954, Serial No. 408,628

9 Claims. (Cl. 204—193.2)

The present invention relates generally to neutronic reactors, and specifically to neutronic reactors for the production of power and radioactive isotopes.

At the present time, power developed by a nuclear reactor producing power alone is believed to necessarily cost more than power produced by conventional power sources. For this reason, it is believed that a neutronic reactor must do more than produce power if atomic power is ever to become of industrial importance. At the present time there is a market for radioactive isotopes which may be produced by a neutronic reactor, including $Pu^{239}$, $U^{233}$, $H^3$, $C^{14}$, $P^{32}$, $S^{35}$ and $I^{131}$.

Radioactive isotopes may be produced by a neutronic reactor due to the fact that a neutron impinging upon an atom of fissionable material which produces fission liberates more than two neutrons on the average, depending upon the nature of the atom of fissionable material which undergoes the fission. Only one of these neutrons must be utilized to sustain the neutronic chain reaction, while the remaining neutrons may be used to convert elements into new isotopes. It is desirable to utilize as many of the neutrons which are not necessary to sustain the reaction as possible by absorbing these neutrons in elements which become desirable radioactive isotopes, rather than absorbing these neutrons in materials which transmute to less desirable materials and thus are lost to the reaction. In fact, in a carefully designed reactor, it is possible that sufficient amounts of $U^{238}$ and $Th^{232}$ may be converted to $Pu^{239}$ and $U^{233}$, respectively, by the absorption of neutrons liberated by the chain reaction to more than replace the fissionable material consumed as fuel by the reaction. At the same time, the neutronic reactor may be producing power, whereby the cost of the power becomes economically competitive with conventional power sources when the value of the fuel produced is subtracted from the total cost.

Whether the neutronic reactor is to be used for converting nonfissionable isotopes to fissionable isotopes or for the production of nonfissionable radioactive isotopes, the neutron energy spectrum of the reactor is important in determining the conversion or production efficiency of the reactor. The neutron energy spectrum of a reactor may be defined as the neutron energy distribution in the regions of the reactor containing the fuel which sustains the neutron chain reaction, generally called the core of the reactor. Neutronic reactors may be classified as fast, intermediate, and slow, or thermal, reactors depending upon the neutron spectrum within the reactor. If the neutron spectrum within the core of the reactor is predominantly of thermal energy, the reactor is termed a thermal or slow reactor, while neutron spectrums averaging up to approximately one thousand electron volts are present in reactors having intermediate energies, and neutron spectrums averaging greater than one thousand electron volts are present in fast reactors.

The energy spectrum of a reactor affects the conversion or production efficiency of a reactor due to several factors. First, nonfission capture by the fuel in the reactor is a function of the energy of the neutron spectrum and is reduced with higher energy neutron spectrums. Second, the loss of neutrons by absorption in structural material of the reactor is also reduced by increasing the energy of the neutron spectrum within the reactor. Third, the loss of neutrons by capture in fission products disposed within the reactor is also reduced by the use of higher energy neutron spectrums. Fourth, neutronic reactions with structural and moderator materials within the reactor, such as the $(n, \alpha)$ reaction in beryllium, may be reduced by the use of higher energy neutron spectrums. Fifth, neutronic reactions with structural and moderator materials, such as the $(n, 2n)$ reaction in beryllium, and fissions produced by fast neutrons in isotopes such as $U^{238}$ which are not fissionable by thermal neutrons, increase the conversion efficiency of a reactor, and are increased with higher energy neutron spectra. Finally, the neutron losses in so-called "heavy isotopes" within the reactor are reduced with higher energy neutron spectrums. "Heavy isotopes" are isotopes of the fuel resulting from nonfission absorption of neutrons in the fuel which are themselves nonfissionable or essentially nonfissionable, an example being $Pu^{240}$ when $Pu^{239}$ is used as the fuel.

While neutron losses within a reactor are decreased with higher neutron energy spectrums, other considerations may make it desirable for one to operate a neutronic reactor at a relatively low energy spectrum. For example, nonfissionable absorption of neutrons in materials which are to be converted to radioactive isotopes is increased in reactors with reduced neutron energy spectrums. Also, the amount of fuel required within the reactor to attain criticality is reduced if the reactor is to be operated with a lower energy spectrum. Also, the specific power of a reactor may be increased by decreasing the energy spectrum of the reactor, the specific power being defined as the power liberated per unit mass of fuel. Hence, it is an object of the present invention to provide a neutronic reactor which has a neutron energy spectrum which may be varied over wide limits.

Not only is it desirable to provide a reactor with a variable neutron energy spectrum, but it is also desirable that the reactivity of the reactor remain essentially constant over the range of neutron spectrums. Hence, it is also an object of the present invention to provide a reactor with a variable neutron energy spectrum having essentially constant reactivity throughout the range of spectrum variation.

Another object of the invention is to provide a reactor which may be used as an isotope converter and which may be used to produce power simultaneously. As explained above, the cost of power produced for commercial purposes may be greatly reduced if the reactor may at the same time be used for converting elements into useful radioactive isotopes. This is particularly true if the isotope formed is fissionable, such as $U^{233}$ and $Pu^{239}$, since the fuel consumed by the reactor would then be at least partially replaced by the fuel produced by the reaction itself.

Other objects and advantages of the present invention will be readily apparent to the man skilled in the art from a further reading of the present specification.

The neutron energy spectrum of a reactor is controlled largely by the moderating effect of the materials within the active portion of the reactor. The active portion of the reactor may be defined as the region within which the materials which contribute to the neutronic chain reaction are confined, this region containing fuel and moderator components as well as structural materials. Also, the coolant medium which is used to extract power from the reactor is partially disposed within the active portion of the reactor and its neutron moderation and absorption must be accounted. The reactor to be described and shown in the figures has an active portion in which the neutron moderation may be varied over wide limits, this variation in neutron moderation controlling the neutron energy spectrum of the reactor.

Figure 5 is a fragmentary vertical sectional view of a suitable fuel element for use within the reactor;

Figure 6 is an elevational view of an insertable moderating element for use within the tank of the reactor;

Figures 7 and 8 are vertical sectional views of the moderating element shown in Figure 6;

Figure 9 is a vertical sectional view of a control element for the reactor;

Figure 10 is an elevational view of a fast absorber element for use in the reactor;

Figures 11 and 12 are vertical sectional views of the fast absorber element shown in Figure 10;

Figure 13 is an elevational view of a slow absorber element for use in the reactor;

Figures 14 and 15 are vertical sectional views of the slow absorber element shown in Figure 13;

Figures 16 and 17 are vertical sectional views of a substitution element for replacing fuel elements in the reactor;

Figure 18 is an elevational view of an alternate form of fuel element from that shown in Figure 5;

Figures 19 and 20 are vertical sectional views of the fuel element shown in Figure 18;

Figure 28 is a horizontal sectional view taken along line 28—28 of Figure 27;

Figure 29 is an elevational view of a portion of the fuel element shown in Figures 26 through 28;

Figure 32 is a schematic view of the coolant circulating system and steam generator associated with the reactor;

Figure 1:
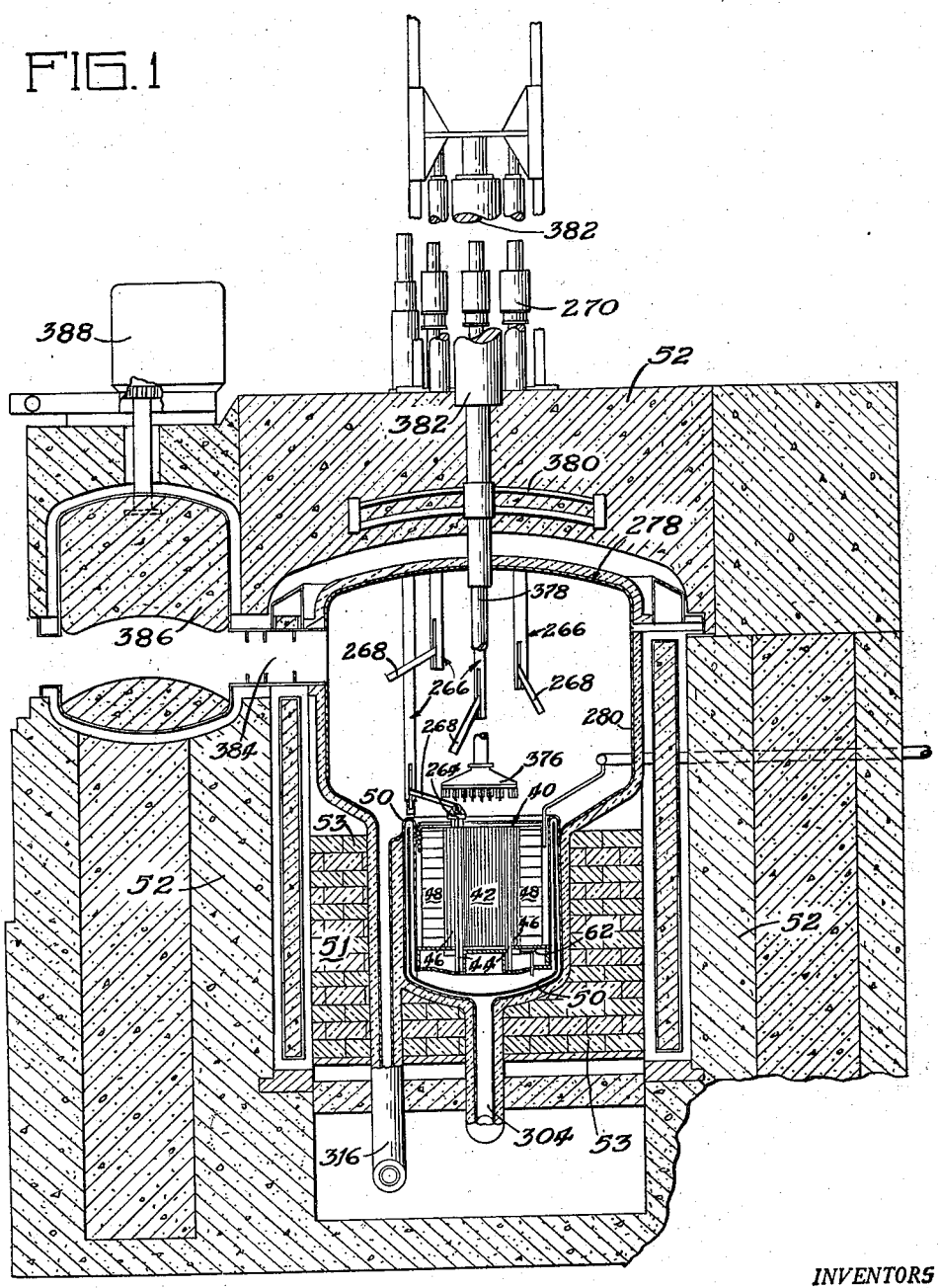
Figure 1 is a vertical sectional view of a neutronic reactor illustrating the present invention.

Figure 33 is a transverse sectional view taken along line 33—33 of Figure 20; and Figure 34 shows a vertical sectional view of a capsule used in the fuel elements shown in Figures 18 through 20 and 33.

The reactor described in the figures produces both power and radioactive isotopes, and exhibits the property of having a variable neutron energy spectrum. This results from the fact that fuel elements and moderating elements are interchangeable, and the substitution of one element for the other does not affect the reactivity of the reactor within limits.

The reactor has an active portion 40 including a core 42, a fast absorber region 46, a slow absorber region 48, and a reflector 44 disposed between the core 42 and the fast absorber region 46. The active portion 40 of the reactor is disposed within a container 50. A neutron-reflecting blanket 51 and a shield 52 surround the container 50.

THE REACTOR ACTIVE PORTION

Figure 2:
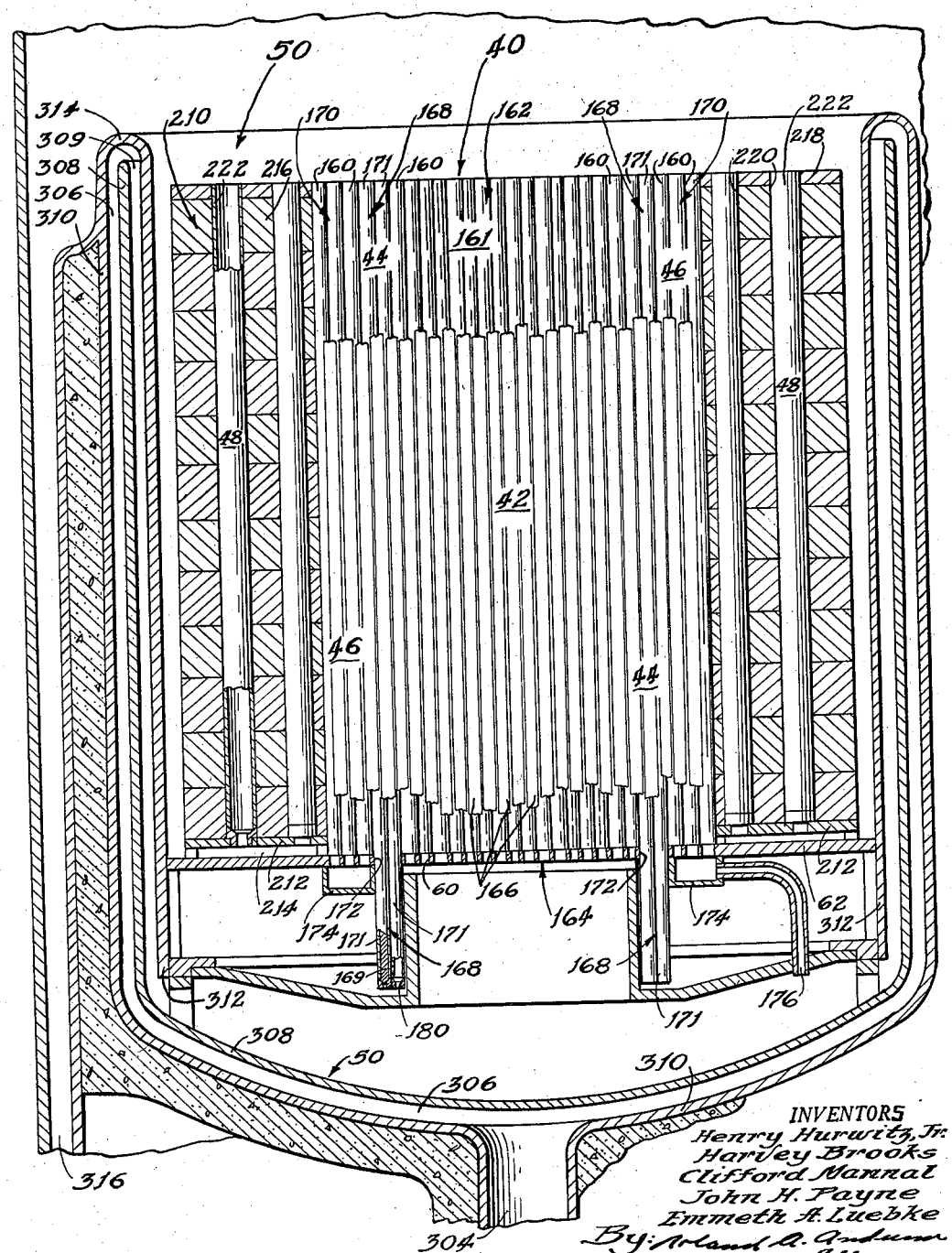
Figure 2 is a vertical enlarged sectional view of the reactor tank shown in Figure 1.
Figure 3:
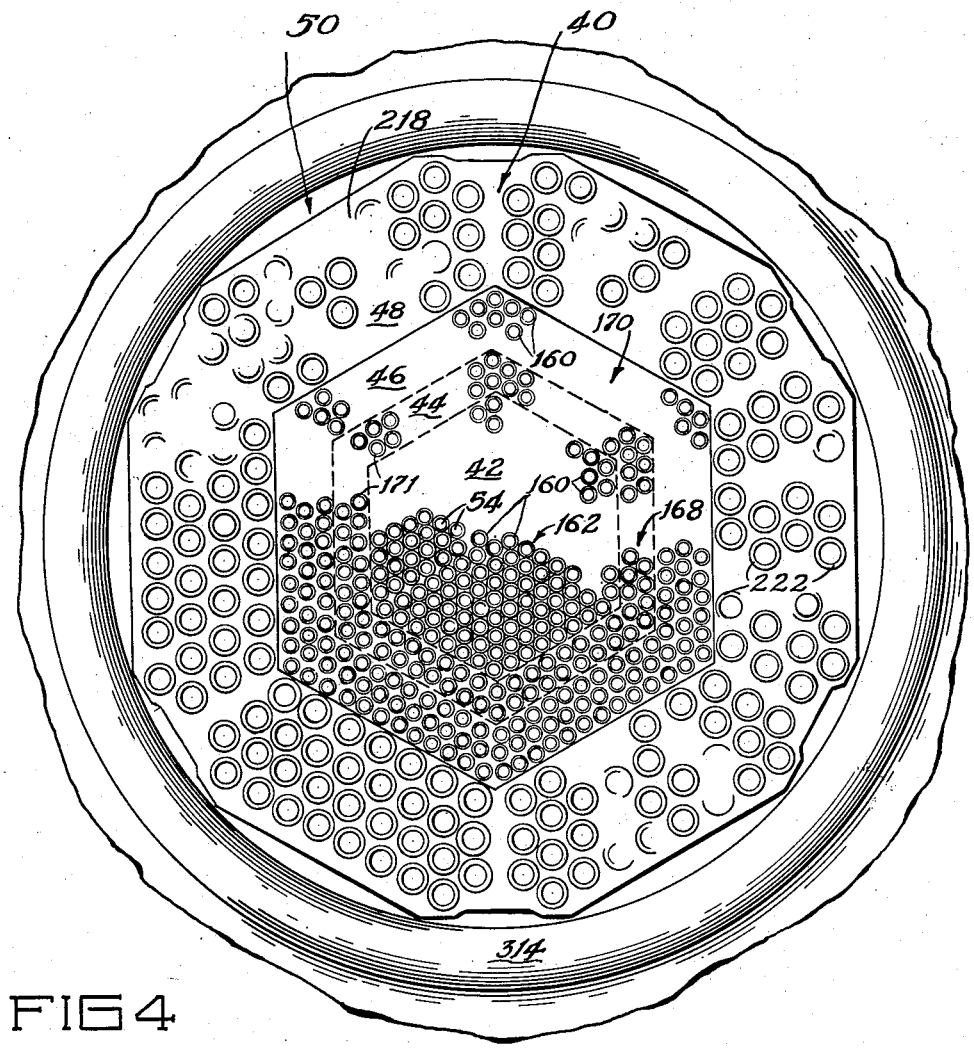
Figure 3 is a plan view of the reactor tank shown in Figure 2.
Figure 4:
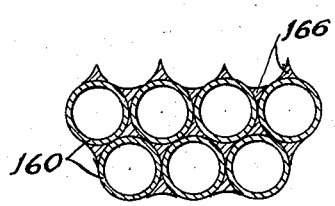
Figure 4 is an enlarged fragmentary horizontal sectional view of a portion of the reactor shown in Figure 2.

The active portion 40 of the reactor is best illustrated in Figures 1 through 3, and contains a plurality of fuel elements 54 in the form of rods disposed within the core 42. The fuel elements 54 need not be of any particular construction as long as they are of suitable physical structure, permit adequate cooling, and contain the proper materials in proper proportions, as will be later set forth. The fuel elements 54 disclosed in Figures 5, 18 through 20, 26, 27, 33 and 34 are suitable for the present reactor. Some of these fuel elements are shown and claimed in our copending application, S.N. 236,644, of Henry Hurwitz, Jr., Harry Brooks, Clifford Mannal, John H. Payne, and Emmeth E. Luebke, now Patent No. 2,799,642, issued July 16, 1957, entitled "Fuel Element," of which this application is a continuation-in-part.

Referring to the fuel element shown in Figures 18 through 20, 33 and 34, and designated 54a, the fuel element is provided with a hanger 64 at one end and a tip 66 at the other end. The tip 66 is adapted to fit within one of the apertures 60 in a support plate 62 mounted adjacent to the bottom of the reactor tank 50. The tip 66 includes a shock-absorbing section 68 which has a spring 70 to absorb as much shock as possible which results from dropping the fuel element 54a into place in the reactor core 42.

The fuel element 54a is provided with a plurality of regions between the hanger 64 and the tip 66, these regions being an absorber region 72, a reflector region 74, a fuel region 76, a second reflector region 78, and a second absorber region 80. When the reactor is fully loaded with fuel elements and other elements, the regions of the fuel elements 54a align to form essentially a cylindrical core 42, surrounded by a hollow cylindrical reflector 44, these regions in turn being surrounded by hollow cylindrical absorber regions, as will be more fully described hereinafter.

The fuel region 76 is provided with a plurality of tubes 82 which contain capsules 84 in which material fissionable by neutrons of thermal energy is disposed. The fissionable material is in the form of a solid mass 86 and only partially fills the capsules 84 leaving a void 88, as illustrated in Figure 34. The mass 86 consists at least 75% of an isotope fissionable by neutrons of thermal energy, i.e., $U^{233}$, $U^{235}$, or $Pu^{239}$. The void 88 is provided to retain fission gases produced by the process of fissioning the fissionable mass 86 within the capsules 84.

In one particular construction of a reactor embodying the invention, specific dimensions and materials given throughout the present disclosure referring to this particular construction, the fuel element 54a has a total length of 54⅝ inches and a diameter of about 1.25 inches. The tubes 82 are constructed of stainless steel with a wall thickness of 0.007 inch, and an outer diameter of 0.090 inch and a length of approximately 18½ inches. The capsules 84 disposed within the tubes 82 are approximately two inches long and have an outside diameter of 0.074 inch. Each capsule 84 contains approximately 8.53 grams of uranium containing 94% $U^{235}$. The capsules 84 are arranged in bundles about the axis of the fuel element 54a in groups of 6, 12, 21, 26, and 32 tubes, respectively, thus providing a total of 97 tubes 82 and 827.41 grams of uranium containing 94% U$^{235}$ in the fuel element 54a.

The reflector regions 74 and 78 are adjacent to opposite ends of the fuel region 76. A sleeve 79 extends from the fuel region 76 to the hanger 64, and a second sleeve 91 extends from the fuel region 76 to the tip 66. A liner 98 extends along the axis of the fuel element 54a from the fuel region 76 to the hanger 64 and terminates in a duct 106 which extends through the hanger 64 to the exterior thereof. In a similar manner, a liner 100 extends axially from the fuel region 76 to the tip 66 and terminates in a duct 110 which communicates with the exterior of the tip 66. A reflector region 74 and the second reflector region 78 are formed by hollow cylinders 90 of neutron-moderating material disposed within the sleeves 79 and 91 about the liners 98 and 100. The absorber regions 72 and 80 are disposed between the reflector regions 74 and 78 and the hanger 64 and tip 66, respectively. Plates 104 secured between the liners 98 and 100 and the sleeves 79 and 91, respectively, support hollow cylinders 102 of the materials which are to be irradiated in the absorber regions 72 and 80.

In the construction of the reactor described herein, the fuel section 76 of the fuel rod 54a is approximately 18 inches long, an additional one and one-half inches is required to attach the fuel section 76 to the reflector section 74 and the second reflector section 78. Both of these reflector sections 74 and 78 are three inches long, and the sleeve 79 is constructed of stainless steel and has an outer diameter of 1.165 inches and a wall thickness of 0.012 inch. The cylinders 90 are constructed of beryllium and have an outer diameter of approximately 1.141 inches and an inner diameter of 0.354 inch. The liners 98 and 100 are also constructed of stainless steel and have an outer diameter of 0.281 inch and a wall thickness of 0.008 inch.

The absorber region 72 contains ten hollow uranium cylinders 102 which are 1.101 inches outer diameter by 0.354 inch inner diameter and 1.012 inches high. The plates 104 are constructed of titanium and are spaced by a distance of 1.032 inches to permit the cylinders 102 to expand along the axis of the fuel element 54a. The second absorber region 80 is constructed in a manner identical with the absorber region 72, except that this absorber region contains eight uranium cylinders 102 which are identical with the cylinders of the first absorber region 72. As a result, the second absorber region is 10½ inches long while the first absorber region is only 8 7/16 inches long.

The hanger 64 has a total length of 5 7/8 inches. The uranium cylinders 102 within the absorber region 72 are surrounded by sodium which is supplied and sealed therein by a pinch tube 108 of glass, also disposed within the hanger 64. The shock-absorber sections 68 is 3 5/16 inches long in its expanded condition, the section 68 being slightly shorter when supporting the weight of the fuel rod 54a. A pinch tube 112 is also disposed within the shock-absorber section 68 and is used to provide sodium around the cylinders 102 in the second absorber region.

An alternate form of fuel element, designated 54b, is shown fragmentarily in Figure 5. This fuel element 54b is identical with the fuel element 54a shown in Figures 18 through 20 with the exception of fuel region, designated 76b, other elements of the fuel rod 54b being designated by the same numbers that are applied to the fuel rod 54a. In this embodiment, a cylindrical sleeve 114 surrounds the fuel region 76b. A plurality of conical members 116 provided with apertures 118 at their vertices are disposed within the sleeve 114 and stacked one upon the other, the apertures 118 being aligned along the axis of the fuel rod 54b. A cone 120 of material fissionable by neutrons of thermal energy is mounted upon the upper surface of each of the members 116, gaps 122 being disposed between the cone 120 and the adjacent members 116. As a result of this construction, gaseous fission products produced by the process of fission will bubble off of the cones 120 of fissionable material and ascend through the apertures 118 in the members 116 through the liner 98 and out of the fuel element 54b.

A third form of fuel element designated 54c is shown in Figures 26 through 29. It also is identical with the fuel element 54a shown in Figures 18 through 20 except for the fuel region designated 76c, and consequently identical numbers will be used to indicate parts of the fuel element 54c which are identical with the fuel element 54a.

The fuel region 76c contains a plurality of rods 124 which are attached to concentric rings 125 and have spirally grooved exterior surfaces 126. Hollow tubes 128 are wound about the rods 124, and the nuclear fuel in the form of material fissionable by neutrons of thermal energy 130 is disposed within the hollow tubes 128.

The rods 124 are constructed of beryllium and have a diameter selected to provide the desired amount of moderator material in the active portion 40 of the reactor. The tubes 128 have an outer diameter of 0.070 inch and a thickness of 0.007 inch and may be constructed of titanium. Material fissionable by neutrons of thermal energy 130 may be U$^{235}$ or Pu$^{239}$.

When it is desired to operate the reactor with a neutron energy spectrum in the intermediate range, a number of moderating elements 132 are positioned within the core 42 of the reactor. These elements 132 are provided with hangers 134 which are similar to the hangers 64 used on the fuel elements 54a. The rods also have tips 136 disposed at the ends opposite the hangers 134 which are similar to the tips 66 of the fuel elements 54a. The moderating elements 132 are provided with three regions 138, 140 and 142 between the hangers 134 and the tips 136. The second region 140, which is intermediate of the other two regions 138 and 142, is provided with a cylinder 144 of moderating material. The cylinder 144 is surrounded by a sleeve 146 to prevent erosion of the moderator cylinder 144. The first and third sections 138 and 142 are solid blocks of material having good thermal conductivity in order to carry away as much heat as possible from the second region 140. The first region 138 is also provided with a central bore 148 which extends from a sodium-filling tube 150 disposed at the lower end of the hanger 134 to a void 152 between the first and second regions 138 and 140 of the moderating element 132. The second region 140 is provided with a channel 154 extending from the void 152 to a second void 156 between the second region 140 and the third region 142. The voids 152 and 156 and the channels 148 and 154, as well as all other void spaces within the moderating element 132, are filled with sodium. The first region 138 of the element 132 is also provided with a rod guide 158 to aid in centering the element 132 when it is placed within the active portion 42 of the reactor.

In the construction of the reactor described throughout this specification, the moderating element 132 has a total length of 54 5/8 inches, the first region 138 being 10 57/64 inches long, the second region 140 being 25 7/8 inches long, the third region 142 being 9 5/16 inches long, and the tip 136 being 2 27/64 inches long. The hanger 134 of each moderating element 132 is 6 1/8 inches long. The moderating elements 132 have a circular cross-section, the largest diameter of the element 132 being at the rod guide 158 and being 1.361 inches. The sleeve 146 has an outer diameter of 1.265 inches and a wall thickness of 0.007 inch and is constructed of stainless steel. The cylinder 144 within the sleeve 146 is constructed of beryllium and the channel 154 is 3/32 inch wide and circular in cross-section. Both the first region 138 and the third region 142 are constructed of soft iron. When placed in the core 42 of the reactor the top 5/32 inch of the first region extends above the permanent portions of the core 42 of the reactor.

The fuel elements 54 are slidably disposed within tubes 160 which are secured together into a hexagonal bundle 161. The support plate 62 has a central pedestal 164 which is hexagonal in shape and supports a group 162 of tubes 160, which are those tubes which contain the fuel elements 54. Substantially triangular shaped members 166 are disposed in the voids between the tubes 160 in group 162. The members 166 are constructed of neutron-moderating materials and substantially affect the neutron energy spectrum within the core of the reactor.

In the particular reactor described throughout this specification, there are 169 tubes 160 in group 162 disposed in a substantially hexagonal configuration which is approximately 18 inches across its flat sides, the tubes 160 being welded together at intervals of one inch or less. The tubes 160 are constructed of type 347 stainless steel and have an outer diameter of 1.393 inches and a length of 48 inches, the wall thickness being approximately 0.014 inch. The substantially triangular members 166 which are disposed between the tubes 160 in group 162 are constructed of beryllium and machined to slide-fit between the tubes 160.

The bundle 161 of tubes includes two additional groups of tubes 168 and 170. The group 168 comprises tubes 171 which are longer than the tubes 160 disposed within group 162 and are disposed within the essentially hexagonal reflector region 44 which surrounds the core 42 of the reactor. The third group 170 of tubes 160 (which are identical to the tubes in group 162) surrounds the group 168 and forms the fast absorber region 46 of the reactor. All three groups of tubes are attached to form the single bundle 161 and are supported by the support plate 62. The beryllium triangular members 166 are also slidably disposed between the tubes 160 and 171 in groups 168 and 170.

The support plate 62 is provided with a plurality of apertures 172 which extends about the hexagonal pedestal 164. The longer tubes 171 of group 168 extend downwardly through the aperture 172 and surround the pedestal 164. The added length of the tubes 171 is utilized to provide control for the reactor, as will be described hereinafter. A trough 174, hexagonal in shape, surrounds the hexagonal aperture 172 in the support plate 62 and is used to conduct the coolant from the tubes 160 in group 170. It is provided with an outlet 176.

In the particular reactor described throughout this specification, the tubes 171 in group 168 are two rows thick and have the same size as those in groups 162 and 170, except the length of these tubes is approximately 11½ inches longer than the tubes 160 in groups 162 and 170. The bundle 161 of tubes, as stated above, is hexagonal in shape and measures approximately 30⅜ inches across the flat sides thereof.

Figure 21:
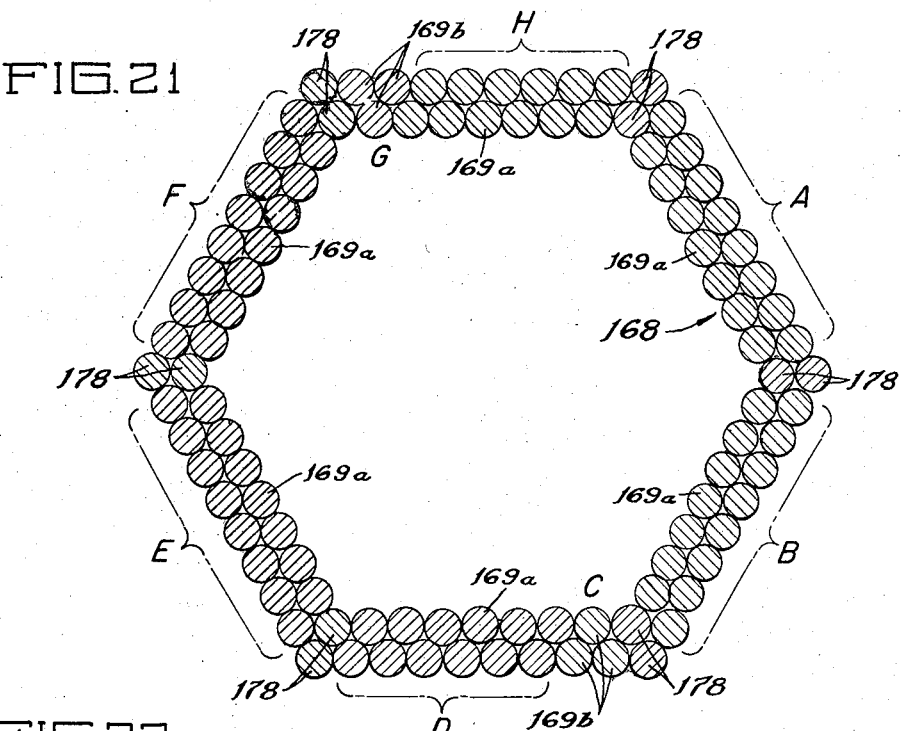
Figures 21 through 25 are symbolic views of the reflector showing the position of control elements therein.
Figure 22:
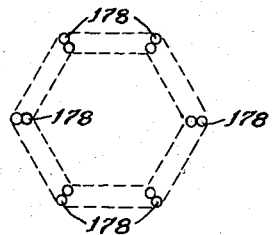

The reflector 44 contains 102 tubes 171 which form group 168. As illustrated in Figures 21 and 22, the corner tubes 171 of group 168 of the bundle 161 contain moderating elements 178 while the other tubes in group 168 contain control elements 169 which are used to control the neutronic chain reaction. The construction of these control elements and their operation will be described hereinafter. The moderating elements 178 are identical to moderating elements 132 in construction, except for being disposed in the reflector 44 of the reactor. The tubes 160 surrounding the moderating elements 178 are shorter than the other tubes 171 in group 168 and rest directly upon the support plate 62.

Fast absorber elements 182 are removably disposed within the third group 170 of tubes 160 which are disposed about the periphery of the reflector 44 and from the fast absorber region 46. Figures 10, 11 and 12 illustrate the fast absorber rods 182. Each fast absorber rod 182 is provided with a hanger 184 similar to the hangers 64 of the fuel elements 54 at one end, and a tip 186 at the other end which is similar to the tips 66 of the fuel elements 54. A sleeve 188 and a smaller concentric liner 190 extend from the hangers 184 to the tip 186 of each fast absorber element 182. The region between the sleeve 188 and the liner 190 is filled with circular masses 192 of the material which is to be transformed into a radioactive isotope by the neutronic chain reaction. The masses 192 are separated from each other by plates 194 which also support the masses 192. Each hanger 184 is provided with a void 196 which is connected to a sodium filling pinch-off tube 198 by means of a duct 200. This void 196 is filled with sodium. The tip 186 is provided with a channel 202 which connects to the liner 190. A corresponding channel 204 in each hanger 184 also connects with the liner 190 so that a flow of coolant can traverse the entire fast absorber element 182. The tip 186 is also provided with a sodium pinch-off tube 206 which is connected to a void 208 between the tip 186 and the mass-containing portion of the fast absorber element 182.

In the particular reactor described throughout this specification, the fast absorber elements 182 are 54.625 inches long and 1.225 inches in outside diameter, thus leaving an annulus of 0.070 inch between the elements 182 and the inside walls of the tubes 160 of group 170, these tubes being 1.365 inches in inside diameter. Both the hanger 184 and the tip 186 of the fast absorber elements 182 are constructed of type 347 stainless steel. Also, the sleeves 188 and the liners 190 are constructed of type 347 stainless steel, the liner 190 having an inside diameter of 0.265 inch. There are 38 masses 192 of uranium 1.15 inches high by 1.157 inches outer diameter and 0.352 inch inner diameter disposed between the sleeve 188 and liner 190 of each fast absorber element 182. However, if it is desired to produce radioactive isotopes other than $Pu^{239}$, other isotopes may be disposed within the fast absorber elements 182. For example, the masses 192 could be constructed in an identical manner with those described above, except that the materials therein consist of $U^{235}$ and thallium, there being one part of $U^{235}$ for each 139 parts by volume of thallium. The plates 194 are constructed of titanium.

The slow absorber region 48 surrounds the fast absorber region 46, as illustrated in Figures 1 through 3. A generally hexagonal hollow prism 210 of solid moderator material is mounted upon a platform 212 above the support plate 62, thereby providing a coolant chamber 214 beneath the prism 210. The prism 210 is constructed of a plurality of relatively thin plates 216. The outside plate 218 is constructed of durable material, such as stainless steel, in order to provide a bearing surface for materials which are to be inserted into the prism 210 through the plate 218. A plurality of channels 220 extend vertically through the prism 210, and these channels 220 are provided with liners 222 of durable material, such as stainless steel.

In the particular reactor described throughout this specification, the prism 210 is constructed of beryllium plates 216 which are approximately two inches thick, and the durable material for the outer plate 218, liners 222 and platform 212 is type 347 stainless steel. The prism 210 has an outer diameter measured across the flats of 54⅞₃₂ inches and an inner diameter measured across the flats of approximately 30⅜ inches. The prism 210 is approximately 48 inches high. There are a total of 270 channels 220 distributed in the prism 210, these channels being approximately two inches in diameter.

Slow absorber elements 224 are removably disposed within the channels 220 in the slow absorber region 48, these elements being illustrated in Figures 13 through 15. The slow absorber elements 224 are provided with hangers 226 at one end and bottom tips 228 at the other end. The hangers 226 are constructed in a manner similar to the hangers 64 provided for the fuel elements 54, except that the hangers 226 are provided with flanges 230 which overlap the outer plate 218 of the prism 210 to hang the slow absorber elements 224 within the channels 220. The tips 228 omit shock-absorbing sections, since the slow absorber elements 224 will not contact the platform 212 and are used primarily to center the elements 224. A rod 232 extends from the hanger 226 to the tip 228 in each of the slow absorber elements 224, and the rod 232 is provided with shoulders 234 at fixed distances along the rod. Washers 236 rest upon the shoulders 234 and support hollow cylinders 238 of materials which are to be irradiated. A sleeve 240 is sealed to each hanger 226 and each tip 228 of the slow absorber elements 224 and surrounds the cylinders 238 within the element 224. Voids 242 are provided between the cylinders 238 and the hanger 226 and between the cylinders 238 and the tip 228. These voids 242 are filled with sodium by means of a filling tube 244 disposed in the hanger 226 which is connected to the voids 242 by means of a duct 246.

In the reactor described throughout the present specification, the slow absorber elements 224 have sleeves 240 with an outer diameter of about 1.8 inches, the sleeves 240 being constructed of stainless steel. The cylinders 238 are constructed of uranium with an outer diameter of 1.762 inches and a height of four inches, and an inner diameter of approximately 0.7 inch. The rod 232 is constructed of stainless steel and has a diameter of 0.5 inch, and the washers 236 are constructed of titanium with a thickness of 0.02 inch.

When the channels 220 within the prism 210 of the slow absorber region 48 are all filled with slow absorber elements 224, the composition of the slow absorber region 48 by volume is approximately 46.3% beryllium, 38.3% uranium, and 15.4% sodium, type 347 stainless steel and titanium.

A blanket 51 of neutron-moderating materials surrounds the container 50. In the particular construction described, graphite with a thickness of approximately 40 inches is used in the form of stacked blocks, designated 53.

REACTOR CONTROL SYSTEM

Control of the reactor is accomplished by varying the ability of the reflector region 44 to reflect neutrons back into the core 42 of the reactor. By varying the reactivity of the reactor in this manner, the control system of the reactor controls the heat generation rate of the reactor, compensates for changes in the reactivity due to burnup of fuel or to temperature changes, and protects the reactor by rapid automatic shutdown if an operating hazard develops.

Figures 21 through 25 are schematic views of the reflector region 44 of the reactor and illustrate the disposition of the moderator and control elements in this region. As indicated in Figures 21 and 22, the six corners of the hexagonal group 168 of tubes 171 contain moderating elements 178, while the other tubes 171 in group 168 contain control elements 169. There are two types of control elements, the one type being shown in Figure 9 and being designated 169a, the other being designated 169b. The location of control elements 169a and 169b are shown in Figures 21 through 25.

As illustrated in Figure 9, the control elements 169a are provided with tips 248 at one end and rods 250 extending from the other end. A cylindrical jacket 252 extends between the tip 248 and a support member 254 of each rod, the support member 254 being attached to the rod 250. Within the jacket 252 is a mass 256 of neutron-moderating material. The mass 256 is spaced from the support member 254 thereby leaving a void 258. A plurality of closed cylinders 260 are disposed about the axis of the control element 169a within the void 258, these cylinders departmenting the void.

The control elements 169b are similar in construction to the control elements 169a but differ in that the support element 254 in control element 169b is directly in contact with the mass 256 of moderating material, thereby eliminating the voids 258 and the cylinders 260. Since the control elements 169b are identical to the control elements 169a in other respects, they will not be separately illustrated. Control elements 169a and 169b are provided with bearings 262 affixed to the periphery of the support members 254. The bearings 262 fit snugly within the tubes 171 of group 168 to align the translatable control elements 169a and b.

In the construction of the reactor described throughout the present specification, the tip 248 is constructed of iron, the jacket 252 is constructed of type 347 stainless steel, the support member 254 is constructed of type 347 stainless steel, the rod 250 is constructed of stainless steel, the cylinders 260 are constructed of type 347 stainless steel, and the masses 256 are constructed of beryllium. There are a total of 15 tubes 171 which are usable for control elements on each of the six sides of the reflector region 44, thereby providing a total of 90 control elements 169 in the reflector region 44. The tubes 171 have an inside diameter of 1.365 inches, and the stainless steel jackets 252 have an outside diameter of 1.25 inches, thereby leaving approximately 0.115 inch clearance. The total length from the support members 254 to the end of the tips 248 of control elements 169b is approximately 23 inches, while this length for control elements 169a is approximately 12.25 inches longer, this being the length of the voids 258 within the stainless steel jacket 252 between the beryllium mass 256 and the support member 254. The bearings 262 are provided with a clearance of approximately 0.02 inch maximum.

Figure 23:
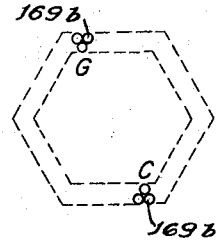
Figure 24:
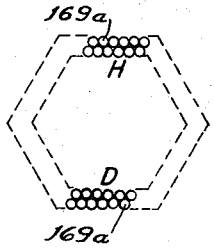
Figure 25:
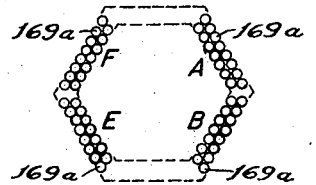
Figure 26:
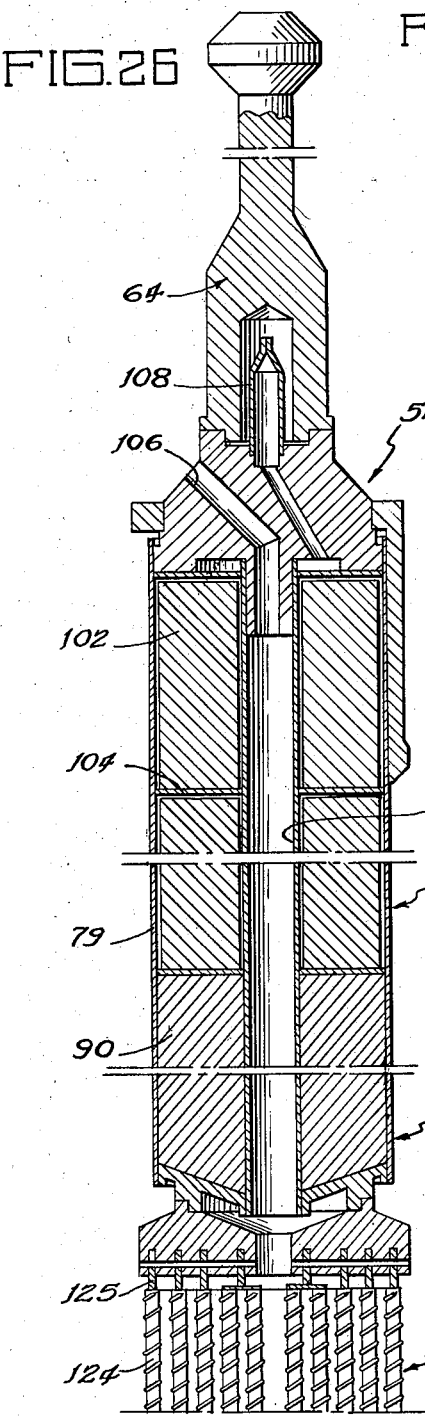
Figures 26 and 27 show a vertical sectional view of a third type of fuel element suitable for use in the reactor.
Figure 27:
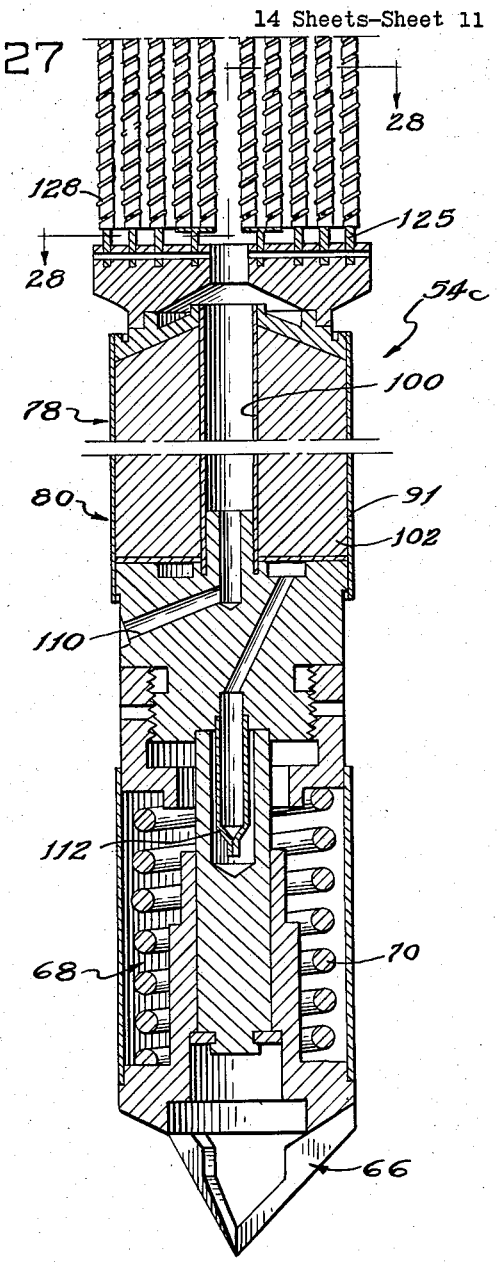

The control elements 169a are actuated in six different groups designated A, B, D, E, F, and H in Figures 21 through 25, and the control elements 169b are operated in two groups designated C and G in Figures 21 and 23. Each of the groups A through H is formed by connecting the rods 250 of the control elements 169a or b that are to compose the groups to a common yoke 264, as illustrated in Figure 1. The yoke 264 is connected to a drive column 266 by offset arms 268. Each of the drive columns 266 are connected to mechanical drive units 270 which raise and lower the offset arms 268 and hence the control elements 169a or b.

The control elements 169a and b are operated in three different manners to provide three different types of control. Groups C and G, composed entirely of control elements 169b which contain merely beryllium, are used for "regulating control" of the reactor. "Regulating control" is used to maintain the reactivity of the reactor at a constant level or to raise or lower the reactivity of the reactor at a relatively slow rate.

Groups D and H are composed of control rods 169a which contain the departmented voids and are used for "shim control." "Shim control" is used to change the reactivity of the reactor in relatively large steps, and thus to bring control of the reactor within the range of control of the regulating control elements in groups C and G. Since the control elements in groups D and H cause reactivity changes greater than those in C and G, changes in the reactivity of the reactor due to fuel burnup, the introduction of absorbing materials into the reactor, changes in reactivities due to temperature changes, and other changes usually of long term duration, are compensated for by the adjustment of the control elements in groups D and H. It may also be desirable to further divide the operation of the control elements in groups D and H into subgroups.

Finally, a third type of control is considered to be essential in order to prevent damages to the reactor as a result of loss of control of the reactor. This third type of control, termed "safety control," is performed by groups A, B, E, and F. The control elements 169a in these groups are maintained during operation in a position giving the reactor maximum reactivity, so that removal of the reactivity attributed by these control elements will effectively poison the reactor and shut it down. The drive mechanisms which operate the rods in groups A, B, E, and F are designed to alter their position from one producing greatest reactor reactivity to one producing minimum reactor reactivity in the shortest possible time.

Figure 30:
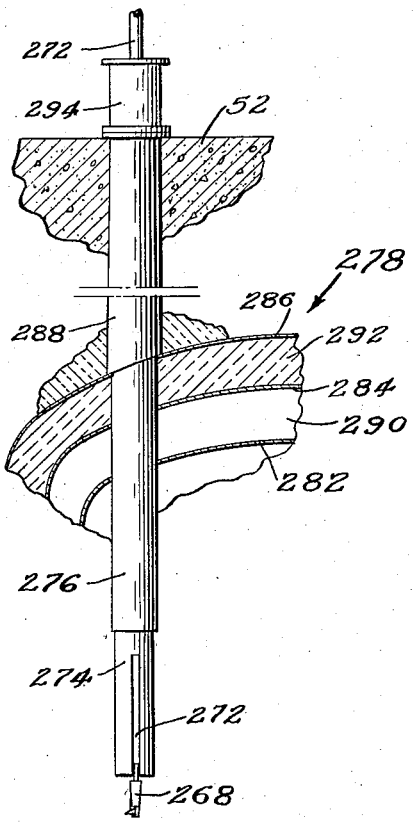
Figure 30 is a vertical sectional view through a portion of the reactor showing the control rod drive mechanism.

As indicated in Figures 1 and 30, the offset arm 268 is attached to an actuating rod 272 which is translatably disposed within a slotted rotatable column 274. The rotatable column 274 is rotatably disposed within a control tube 276 which extends through the roof 278 of the reactor container 280. The roof 278 of the reactor container 280 has three layers 282, 284, and 286, and the control tube 276 is sealed to the two lower layers 282, and 284. A shield tube 288 is disposed about the control tube 266 above the third layer 286 and is sealed to the layer 286. An annulus 290 is disposed between the layers 282 and 284 for purposes of permitting a flow of helium to sweep any fission product gases from the region, and a layer of thermal insulation 292 is disposed between the layers 284 and 286.

Figure 31:
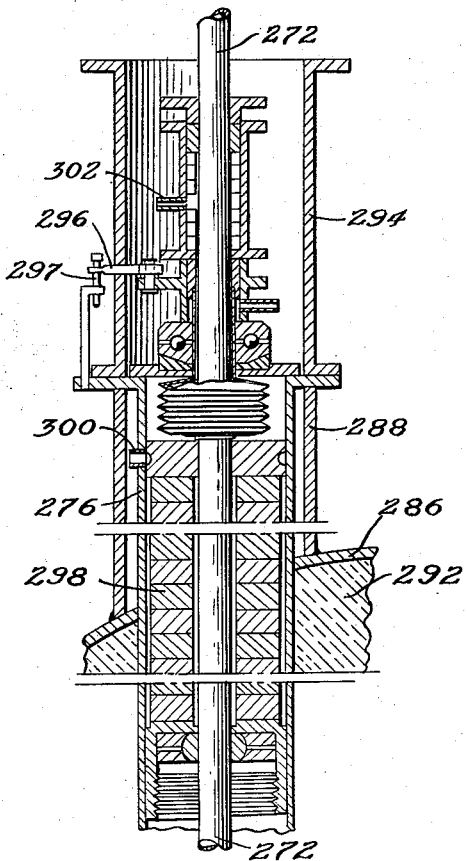
Figure 31 is a vertical sectional view of a portion of the control rod drive mechanism shown in Figure 30.

A rotatable hub 294, illustrated in Figures 30 and 31, is disposed adjacent to the shield tube 288 and is coupled to the control tube 276 by means of a pin 296. The pin 296 is removably secured to the control tube 276 by a locking pin 297. As a result of this construction the offset arms 268 may be turned to a position remote from the reactor tank 50 to enable loading operations and repairs to be accomplished without interference from the offset arms 268. Shielding rings 298 surround the rod 272 within the control tube 276, and helium is circulated between the rings 298, the helium being introduced into port 300 and port 302.

The control elements within the reactor may be positioned by translation of the rod 272. The position of maximum reactivity occurs when the control elements 169 are in the up or raised position within the reflector region 46 of the reactor. This results because the mass 256 of beryllium is disposed within the reflector region 46 adjacent to the core 42 of the reactor, thereby reflecting a larger proportion of neutrons originating within the core 42 back into the core 42. When the control elements 169 are lowered, a region of void replaces the beryllium within the reflector, thereby reducing the ability of the reflector to reflect neutrons, and thus lowering the reactivity of the reactor.

When the reactor is first started with a fresh batch of fuel elements 169a in the core 42, all of the safety control elements 169a, i.e. groups A, B, E and F, are positioned to give the reactor maximum reactivity, that is, the control elements 169a in these groups are raised to dispose their beryllium positions adjacent to the core 42. The shim control elements 169a in groups D and H are lowered to positions of minimum reactivity, and the regulating elements 169b in groups C and G achieve a neutron reproduction ratio of unity when positioned approximately in the center of their travel. As the reactor is operated, the multiplication factor of the reactor is reduced due to buildup of fission products, burnup of a portion of the fuel, and loss of reactivity due to temperature increase, it will be necessary to position the shim controls in groups D and H to positions of greater reactivity.

POWER PRODUCTION

The reactor is cooled by flow of liquid sodium. The liquid sodium enters the tank 50 through a coolant entrance pipe 304 at the base of the tank and enters into a cavity 306 beneath the reactor, as illustrated in Figures 1 and 2. The cavity is formed by a cup-shaped member 308 which is disposed within the tank 50 and spaced from the outer wall 310 thereof. The outer wall 310 loops around the open end of the cup-shaped member 308 and extends downwardly parallel to the member 308 leaving a cavity 309 between the downwardly extending portion of the outer wall 310, designated 312, and the cup-shaped member 308. The liquid sodium flows through the cavity 306 and upwardly between the cup-shaped member 308 and the outer wall 310 of the tank 50. The sodium then flows across the top of the cup-shaped member 308 and downwardly in the cavity 309. The entire container 50 then becomes filled with a pool of sodium which spills across the lip 314 formed by the turn of the outer wall around the cup-shaped member. The sodium is then conducted away from the reactor by an outlet pipe 316, shown in Figures 1 and 2.

Liquid sodium is used as a coolant because it has a relatively high neutron scattering cross section, low neutron absorption cross section, and because it is a poor moderator due to its low density. It has also been used because it has a relatively low melting point and is compatible with several structural materials, notably, stabilized stainless steel and nickel. However, sodium becomes radioactive upon exposure to neutron flux in the reactor, thus presenting a health hazard. Also, it is inflammable and reacts explosively with water. For these reasons, care must be exercised in the use of sodium particularly when contact with steam or water is possible.

Because of the corrosive nature of sodium when used with most materials, all of the piping, tank 50, and other structural members which contact sodium, commercially available type 347 stainless steel has been used. Type 347 stainless steel contains 18% chromium, 10% nickel, steel, and it is columbium stabilized.

In the reactor described throughout the present specification, normal operation develops 10,000 kilowatts of power. Under these conditions, the temperature of the sodium leaving the reactor is approximately 750° F. and has undergone a temperature rise of 180° passing through the reactor with a flow rate of 1400 gals. per minute. Under overload operation conditions the reactor may be operated at a power of 30,000 kilowatts. When so operated the temperature of the sodium leaving the reactor may be 750° F. and the sodium will experience a temperature rise of 270° F. in passing through the reactor at a flow rate of 2800 gals. per minute.

Oxygen and carbon are the only impurities of sodium known to have damaging effects upon type 347 stainless steel. Oxygen, present as $Na_2O$, leads to the formation of a loosely adhering scale and consequent loss of surface metal when present in amounts in excess of the solubility limit, which has been determined to be about 0.05% oxygen by weight at 400° C. and about 0.10% at 500° C. Carbon in sodium or NaK causes carburization of the stainless steel surface layers which then possess lower ductility. Since the calcium gettering process reduces oxygen to less than 0.01% and also effectively removes carbon, the initially charged sodium assures reliable operation. A rise in oxygen or carbon during operation is minimized by (1) starting with a clean, leak-tight system, (2) controlling helium impurity content, and (3) eliminating sources of carbon such as plain carbon steel. Should a rise in impurities be detected a sodium repurification system should be used to provide a fresh charge.

Both the pressure drop and the velocity of the coolant flowing through the core 42 of the reactor will vary depending upon the number of fuel rods inserted in the reactor core. With a total of 169 fuel elements 54a disposed within the core 42, the pressure drop will be four pounds per square inch and the maximum flow velocity will be seven feet per second. However, if a slower neutron spectrum is operating, there being 50 fuel elements 54 disposed within the core, then a pressure drop of ten pounds per square inch will occur and a maximum velocity of 16 feet per second. The above figures are given for a reactor operating at 30,000 kilowatt power level and 270° F. temperature rise across the reactor.

Figure 32 is a diagrammatic view of the power-generating system for the reactor. As illustrated, the reactor, designate 318, is provided with two closed loop sodium-circulating systems, the one system flowing through a first intermediate heat exchanger 320 and the other system through a second heat exchanger 322. Both closed circuits are provided with valves 321 and 323, respectively, and only one circuit is used at a time, the other circuit being held in a stand-by condition. Also, both of the circuits are provided with pumps 324 and 326. The heat exchangers 320 and 322 transfer the heat from the reactor 318 to a second circulating system. The second circulating system is also a closed loop and uses sodium-potassium alloy to transfer thermal energy from the heat exchangers 320 or 322 to a steam generator 328 or 330. Both of these steam generator loops are provided with pumps 332 or 334. A supply of water is pumped by pumps 336 or 340 to the steam generators 328 and 330. The steam generated by the steam generator 328 or 330 may be used to produce electrical power, heating space, or to provide mechanical movement, just as in all other cases of steam utilization.

The reactor is also provided with an overflow tank 340 which is connected to the reactor 318. The sodium within the overflow tank 340 may be pumped back into the reactor by means of pump 342. Also, fresh sodium may be introduced into the reactor through this circuit by means of valve 344, and sodium may be removed from the circuit through valve 345.

The reactor is also provided with a stand-by cooling system. The stand-by cooling system comprises two heat exchangers 346 and 348. The one heat exchanger 346 is mounted in a cooling stack 350 and the other heat exchanger 348 is disposed within the reactor around the periphery of the tank 50. Air is then circulated through the stack 350 by means of a fan 351, and the heat is removed from the sodium in the reactor resulting from the decay of radioactive materials.

The steam generators 328 and 330 are capable of generating steam at a temperature of 550° F. and 465 pounds per square inch of area when the reactor is operated at a power level of 30,000 kilowatts, and 478° F. at 200 p.s.i.a. when operated at 10,000 kilowatts. At full capacity, approximately 10,000 gallons of water per hour are required to feed the steam generators 328 and 330.

Due to the fact that the sodium coolant flows upwardly in the tubes 160, there is a tendency for the fuel elements 54 to be forced upwardly in the tubes 160. For this reason, a hold-down plate 376 has been provided to contact the hangers 66 of the fuel elements 54. The hold-down plate 376 may be raised by means of column 378 which extends through the roof 278 of the reactor container 280 and through the shield 52. Reinforcements 380 are disposed within the shield 52, since the flow of coolant places a large force upon the hold-down plate 376. The column 378 terminates in pneumatic cylinders 382 positioned above the shield 52. The cylinders 382 raise the hold-down plate 376 from its position resting on the fuel elements 54 to permit removal of the fuel elements 54, and also supply the force to hold the fuel elements 54 in position when the reactor is operating.

Access to the interior of the reactor container 280 is obtained through a port 384 from the side of the reactor. The port 384 is closed by a shield block 386 which may be positioned in the port 384 by positioning means 388 positioned above the shield 52 of the reactor.

VARIABLE NEUTRON SPECTRUM

One of the advantages of the reactor embodying the present invention is that the neutron spectrum of the reactor may be varied over a relatively wide range. The neutron spectrum of a reactor may be defined as the energy distribution of neutrons within the core of the reactor, which is generally summarized in terms of the average neutron energy. However, it is understood that neutrons of virtually all energies from thermal energy to the energy of a virgin neutron, i. e., a neutron which has just been produced by fission, occur within the core of all reactors. The energy spectrum of the present reactor may be varied from an energy of approximately 0.1 k.e.v., to 100 k.e.v., these energies being the mean energies of the spectra.

In order to obtain the highest neutron energy spectrum possible, the amount of neutron-moderating material must be minimized, since it is the presence of moderating substances which reduces the energy of the neutron spectrum. In this connection, it must be remembered that the structural materials within the reactor, as well as elements inserted within the reactor for the purpose of moderating, are effective in reducing neutron energies, but as a general rule, that the effectiveness of these materials is inversely proportional to their atomic weight.

In order to obtain a variable neutron spectrum, the present reactor has been constructed with a core consisting of a plurality of "unit cells," these "unit cells" being in the form of hexagonal prisms with sides tangent to the tubes 160 or 171 of the core of the reactor including the fuel element or other element which is disposed within the tubes. By replacing the element which is disposed within the tube of a given unit cell, the neutronic properties of that cell may be effectively changed.

Even though the core of the present reactor consists of a number of unit cells, the reactivity of the core may be determined by treating the core as a homogeneous mass, rather than a system employing "lumped geometry," such as that disclosed in the patent application of Enrico Fermi and Leo Szilard, Serial No. 568,904, filed December 19, 1944, now Patent No. 2,708,656, issued on May 17, 1955. In other words, the reactivity of the reactor has not been optimized by spacing units of fuel in a geometric pattern relative to each other.

The variable energy neutron spectrum of the present reactor results from an equivalency with regard to reactivity of fuel elements 54a and moderating elements 132. This equivalency is obtained in spite of the fact that each unit cell contains, in addition to the removable element, a tube 160, portions of the beryllium triangular members 166 that are within the unit cell, and the sodium coolant disposed between the tube 160 and within the removable element. It has been found that in a reactor core consisting of unit cells, the core containing sodium between seven and nine times the volume of isotopic fuel (i. e., $U^{235}$, $Pu^{239}$, or $U^{233}$) disposed in the core, a fuel-containing cell may be replaced by a unit cell containing beryllium from eight to ten times the volume of the isotopic fuel disposed in the fuel unit cell without changing the reactivity of the reactor substantially, providing at least half of the total number of unit cells in the reactor core contain fuel. In such a reactor, the "active reaction elements," i.e., the elements which determine the nature of the reaction rather than merely retard it, consist of sodium, fissionable material in the form of $U^{233}$, $U^{235}$, or $Pu^{239}$, and beryllium. Since the neutron-moderating effects and neutron-producing effects of other elements within the reactor contribute so little to the reaction they do not class as active reaction elements. These other elements within the reactor, such as structural materials, will be termed "reaction retarding elements," since they do not contribute to the reaction substantially by means of producing neutrons or adjusting their energy, but merely absorb neutrons and reduce the reactivity of the reactor core.

In the particular reactor described, there are 169 tubes in the core of the reactor, and hence 169 unit cells. When all 169 of these core unit cells contain fuel elements 54a, the reactor core 42, and the regions above and below the core, contain the following materials.

Table I.—The composition of a unit cell containing a fuel element 54a

| Portion of Fuel Element 54a | Volume Percentages of Unit Cell | | | | | | | |
|---|---|---|---|---|---|---|---|---|
| | Na | St. Stl. | Be | U-235 | U-238 | U-Nat | Ti | Void |
| Core Region (18" long) | 48.77 | 17.63 | 8.78 | 8.26 | 0.62 | | 9.48 | 6.46 |
| Transition Section (1³²⁄₃₂" long) | 61.93 | 25.13 | 12.94 | | | | | |
| Reflector Regions (2⅞" long) | 27.73 | 6.60 | 65.67 | | | | | |
| Top Converter Region (10½" long) | 33.64 | 8.56 | 8.78 | | | 49.02 | | |
| Bottom Converter Region (8⁷⁄₁₆" long) | 33.86 | 8.56 | 8.78 | | | 48.8 | | |

When a moderating element 132 is disposed within a tube 160, that cell contains the materials set forth in Table II by volume.

Table II.—The composition of a unit cell containing a moderating element 132

| | Region of Element | | |
|---|---|---|---|
| | First Region, Percent | Second Region, Percent | Third Region, Percent |
| Stainless Steel | 3.71 | 5.26 | 3.69 |
| Beryllium | 10.6 | 81.59 | 10.24 |
| Sodium | 24.26 | 13.15 | 24.25 |
| Iron | 61.43 | | 61.82 |

The reactor construction set forth in this specification has been designed to provide approximately 10% extra reactivity in order to have flexibility for experiments conducted within the reactor, compensate for fuel burnup, and the like. For this reason, the reactor is provided with a number of sodium-containing elements 352 illustrated in Figures 16 and 17 even though it is understood that the reactor may be constructed and the invention practiced without the use of these elements 352 by reducing the number of unit cells in the core of the reactor.

The sodium-containing elements 352 are provided with hangers 354 and tips 356 which are identical to the hangers 64 and tips 66 of the fuel elements 54a. Also, in a manner identical with the fuel elements 54a, the sodium-containing elements 352 contain an absorber region 358 and a reflector region 360 disposed between the hangers 354 and a void region 362, which corresponds to the fuel region 76 of the fuel element 54a. A reflector region 364 and a second absorber region 368 are disposed between the void region 362 and the tips 356. The void region 362 is formed by means of a hollow tube 369 extending between the first and the second reflector regions 360 and 364. The tube 369 is provided with apertures 370 therein for the purpose of admitting the sodium coolant to this void region. A channel 372 extends from the hanger 354 through the converter region 358 and the reflector region 360 into the void region 362, and a second channel 374 extends from the void region 362 through the second reflector region 364 and second converter region 368. The second channel 374 is provided with an aperture 376 to the exterior of the element. The dimensions of the sodium-containing elements 352 are identical with those of the fuel elements 54a, the void region 362 replacing the fuel region 76 of the fuel elements 54a and having the same diameter as the fuel region 76.

When a sodium-containing element 352 is disposed within a tube 160, a unit cell with the composition set forth in Table III by volume is produced.

Table III.—The composition of a unit cell containing a sodium-containing element 352

| | Na, Percent | St. Stl., Percent | Be, Percent | U (natural), Percent |
|---|---|---|---|---|
| Absorber Region | 33.64 | 8.56 | 8.78 | 49.02 |
| Reflector Region | 27.73 | 6.60 | 65.67 | |
| Void Region | 85.96 | 5.26 | 8.78 | |
| Second Reflector Region | 27.73 | 6.60 | 65.67 | |
| Second Absorber Region | 33.86 | 8.56 | 8.78 | 48.8 |

The composition of each unit cell having fast absorber elements 182 by percent of volume is given in the following table.

Table IV.—Unit cell composition having fast absorber elements

| | Percent |
|---|---|
| Stainless steel | 8.59 |
| Beryllium | 8.32 |
| Natural uranium | 55.30 |
| Sodium | 27.79 |

The composition by volume of a unit cell with slow absorber elements 224 is given in the following table. The unit cells in the slow absorber region are identical to those throughout the reactor except the sides are not tangent to the tubes 160, but merely common with other cells, except for outer cells.

Table V.—Unit cell composition having slow absorber elements

| | Percent |
|---|---|
| Stainless steel | 4.5 |
| Beryllium | 45.6 |
| Natural uranium | 37.7 |
| Sodium | 12.2 |

A blanket 51 of neutron-moderating materials surrounds the container 50. In the particular construction described, graphite with a thickness of approximately 40 inches is used in the form of stacked blocks, designated 53.

It has been found that the reactivity of the reactor changes substantially when a fuel element 54a is replaced by a moderating element 132 if less than one-half of the units within the core 42 of the reactor contain fuel elements 54a. For this reason, the slowest neutron spectrum which may be used in the reactor without changing the reactivity thereof substantially contains the following elements in the tubes 160:

Fuel elements 54a _____ 85
Beryllium-moderating elements 132 _____ 67
Sodium-containing elements 352 _____ 17

The following table gives the percentage of materials within the core 42 of the reactor when containing the above loading, by volume.

Table VI.—Material composition of core with low energy spectrum

| | Percent |
|---|---|
| Sodium | 38.38 |
| Stainless steel | 11.60 |
| Beryllium | 37.54 |
| Uranium (enriched) | 4.46 |
| Titanium | 4.76 |
| Void | 3.26 |

The highest energy neutron spectrum is obtained with the core 42 of the reactor containing all fuel elements 54a, however, since the reactor is provided with a 10% margin of reactivity, the following loading is used when the reactor has new fuel elements 54a and no additional absorbing material therein:

| | |
|---|---|
| Fuel elements 54a | 152 |
| Sodium-containing elements 352 | 17 |

Under these conditions the materials by volume disposed within the reactor core 42 are as follows:

| | Percent |
|---|---|
| Sodium | 52.51 |
| Stainless steel | 16.39 |
| Beryllium | 8.78 |
| Uranium (enriched) | 7.98 |
| Titanium | 8.52 |
| Void | 5.82 |

In summary, then a reactor constructed in accordance with the present invention will have a core consisting of a plurality of adjacent elongated regions of approximately equal volume having parallel approximately equally spaced axes, said core may contain fuel elements in at least one-half the regions, said regions containing 8 to 10% uranium, 40 to 50% sodium and not more than 10% beryllium, sodium-containing elements in not more than 10% of the other regions of the core, said sodium-containing regions containing 80 to 90% sodium and not more than 10% beryllium and neutron-moderating elements in the remaining regions, said regions containing at least 80% beryllium and between 10 and 15% sodium.

Thus far, emphasis has been placed upon the core since it affects reactivity to a greater extent than other elements. The other elements of the reactor, namely, the reflector, fast and slow absorbers, and the shield itself do have an effect upon the reactivity of the reactor, but the combined function of these elements may be summarized as neutron leakage controlling means, since the net effect of these elements will be a neutron loss to the reaction. However, the amount of the neutron loss will be determined by the particular reflector, fast absorber and slow absorber which are used. While other materials could equally well be used in the absorber section of the reactor, the particular reactor described throughout this specification contains 102 reflector rods, 198 fast absorber rods, and 270 slow absorber rods regardless of the energy spectrum of the core of the reactor. Constructed in this manner the reflector contains the following percentages of materials by volume:

Table VII

| | Percent |
|---|---|
| Stainless steel | 7.64 |
| Beryllium | 67.13 |
| Sodium | 24.28 |
| Void | 0.95 |

The fast absorber contains the following percentages of materials by volume:

Table VIII

| | Percent |
|---|---|
| Uranium (natural) | 49.41 |
| Stainless steel | 9.85 |
| Beryllium | 7.76 |
| Sodium | 31.77 |
| Void | 1.21 |

The slow absorber contains the following materials in percent by volume:

Table IX

| | Percent |
|---|---|
| Uranium (natural) | 38.70 |
| Stainless steel | 4.20 |
| Beryllium | 41.25 |
| Sodium | 15.45 |
| Void | 0.40 |

While slightly less than 140 kg. of uranium containing 94% of the isotope $U^{235}$ has been set forth, uranium with a similar enrichment in the isotope $U^{233}$, or the fuel containing 94% $Pu^{239}$ is also effective to sustain the chain reaction. Using $U^{235}$, it has been found that a total mass of 114.2 kg. is the minimum mass suitable for sustaining a neutronic chain reaction in the reactor described with the high energy loading referred to above, while a mass of approximately 60 kg. of 94% $U^{235}$-enriched uranium may be used to sustain a neutronic chain reaction when the loading containing 85 fuel units is employed.

It may be desirable when using the present reactor as a breeder of fissionable materials, to incorporate a two-section core. In such a reactor, the core 42 contains an inner volume of $Pu^{239}$ which is an effective fuel material for a breeder. However, $Pu^{239}$ is only effective as a breeder at relatively high energies, and since a beryllium reflector is employed in the present reactor, the $Pu^{239}$ loses its effectiveness when placed in the regions adjacent to the beryllium reflector. For this reason, the core may be constructed with an outer volume containing $U^{233}$ as fuel disposed about an inner volume containing $Pu^{239}$ as fuel, so that in the regions immediately adjacent to the beryllium reflector where the neutron energy is relatively low, the more effective $U^{233}$ will be employed. Since $U^{233}$ may be obtained by the conversion of $Th^{232}$, a reactor operated in this manner should contain thorium sections in at least some of the absorber elements in the first and/or second absorber region surrounding the reflector in order to provide both types of fuel for the mixed core of the reactor.

The terms "fast" and "slow" used in defining regions 46 and 48, respectively, refer to rate of conversion by absorption of neutrons and not to energy level of neutrons in these regions.

As a further aid in understanding the present invention, reference is made to the following publications: Experimental Production of Divergent Chain Reaction, E. Fermi, American Journal of Physics, vol. 20, No. 9, December 1952; Science and Engineering of Nuclear Power, C. Goodman, Addison Wesley Press, Inc., Cambridge, Mass., vol. 1 (1947) and vol. 2 (1949); The Elements of Nuclear Reactor Theory, S. Glasstone and M. Edlund, D. Van Nostrand Co., Inc., New York, 1952; Elementary Pile Theory, H. Soodak and E. C. Campbell, John Wiley and Sons, New York, 1950; and to the copending U.S. patent application, Serial No. 568,904, of common assignee, filed December 19, 1944, in the names of E. Fermi and L. Szilard, now Patent No. 2,708,656, issued on May 17, 1955.

While the foregoing description of the invention describes a particular reactor in detail, it is not intended that the scope of the invention be limited except insofar as set forth in the following claims.

What is claimed is:

1. A neutronic reactor comprising, in combination, a core consisting of 169 elongated regions having parallel axes, a cylindrical stainless steel tube disposed within each region coaxially about the axis thereof, said tubes contacting each other and being attached together forming a generally hexagonal bundle, said tubes having outer diameters of 1.393 inches and wall thicknesses of 0.014 inch and said core being approximately eighteen inches long, at least 85 fuel elements disposed within the tubes and essentially uniformly distributed throughout the core of the reactor, each of said fuel elements containing approximately 828 grams of uranium containing approximately 94% $U^{235}$, the regions containing fuel elements containing 48.77% sodium, 17.63% stainless steel, 8.78% beryllium, 8.88% uranium, 9.48% titanium, and 6.46% void; not more than 17 sodium-containing elements disposed within certain tubes and essentially uniformly distributed throughout the core of the reactor, the regions containing sodium-containing elements containing 85.96% sodium, 5.26% stainless steel and 8.78% beryllium; and the remaining tubes in the reactor core containing moderating elements, the regions containing moderating elements containing 13.15% sodium, 5.26% stainless steel and 81.59% beryllium by volume; and a neutron reflector disposed about the core of the reactor.

2. A neutronic reactor comprising, in combination: a central region having 169 stainless steel tubes with inside diameters of 1.365 inches and outside diameters of 1.393 inches, said tubes contacting each other and forming an essentially hexagonal bundle approximately 18 inches across its flat sides and 48 inches long, beryllium members disposed in the regions between contacting tubes, at least 85 fuel elements disposed within the stainless steel tubes, each element comprising a fuel region disposed centrally within each tube, said fuel region containing 97 stainless steel tubes with a wall thickness of 0.007 inch and an outer diameter of 0.090 inch and a length of approximately 18½ inches, a plurality of capsules approximately 2 inches long and having an outer diameter of 0.074 inch containing 8.53 grams of uranium and void and being constructed of titanium being disposed within the tubes in the fuel region, the uranium containing at least 94% $U^{235}$, reflector regions adjacent to the ends of the fuel region within each fuel element, said reflector regions being approximately 3 inches long and containing beryllium disposed within stainless steel liners, and absorber regions adjacent to the two reflector regions containing uranium; a reflector region disposed about the central region; and an absorber region disposed about the reflector region.

3. A neutronic reactor having a core consisting of a plurality of adjacent elongated regions of approximately equal volume having parallel approximately equally spaced axes, a hollow tube disposed within each region coaxially about the axis thereof, a fuel element removably disposed within at least half of the tubes, each fuel element containing the same mass of an isotope of material fissionable by neutrons of thermal energy, the total weight of said isotopic mass in the core being between 60 and 140 kg., and the core containing a volume of sodium between seven and nine times the total volume of thermal neutron fissionable isotope in the core, and neutron moderating elements disposed in at least a portion of the other tubes in the core consisting of nonfissionable materials including a mass of beryllium, the total mass of beryllium in the regions containing neutron moderator elements being between eight and ten times the volume of the thermal neutron fissionable isotope in the regions containing fuel elements.

4. A neutronic reactor having a core consisting of a plurality of adjacent elongated regions of approximately equal volume having parallel approximately equally spaced axes, a hollow tube disposed within each region coaxially about the axis thereof, a fuel element disposed within at least one-half of the tubes, each fuel element containing approximately the same mass of $U^{235}$, the total weight of $U^{235}$ in the core of the reactor being between 60 and 140 kg. and said core containing a volume of sodium between seven and nine times the total volume of $U^{235}$ therein, a neutron moderating element disposed within at least a portion of the other tubes of the core consisting of nonfissionable materials including a mass of beryllium, the total mass of beryllium in regions containing neutron moderating elements being between eight and ten times the volume of $U^{235}$ in the regions containing fuel elements.

5. A neutronic reactor having a core consisting of a plurality of adjacent elongated regions of approximately equal volume having parallel approximately equally spaced axes, a hollow tube disposed within each region coaxially about the axis thereof, a fuel element disposed within at least one-half of the tubes of the core, the regions containing said fuel elements comprising 8 to 10% uranium consisting of at least 75% $U^{235}$, 40 to 50% sodium, and not more than 10% beryllium, sodium containing elements disposed in not more than 10% of the other tubes of the core, the regions containing sodium elements containing 80 to 90% sodium and not more than 10% beryllium, and neutron moderating elements disposed in the remaining tubes of the core of the reactor, the regions containing neutron moderating elements containing at least 80% beryllium and between 10 and 15% sodium, said fuel elements, neutron moderating elements, and sodium elements being essentially uniformly distributed throughout the core of the reactor and the total mass of uranium in said core being between 60 and 140 kg.

6. A neutronic reactor comprising the elements of claim 5 in combination with a neutron reflector surrounding the core of the reactor, and means to vary the reflectivity of the reflector.

7. A neutronic reactor having a core consisting of a plurality of adjacent elongated regions of approximately equal volume having parallel equally spaced axes, a hollow tube disposed within each region coaxially about the axis thereof, a fuel element disposed within at least one-half of the tubes, the regions containing fuel elements containing approximately 48.77% sodium, 17.63% stainless steel, 8.78% beryllium, 8.88% uranium consisting of 94% $U^{235}$, 9.48% titanium, and 6.46% void; sodium containing elements disposed in not more than 10% of the other tubes of the reactor core, the regions containing sodium elements consisting of 85.96% sodium, 5.26% stainless steel, and 8.78% beryllium; neutron moderating elements disposed in the remaining tubes of the core of the reactor, the regions containing neutron moderator elements consisting of 13.15% sodium, 5.26% stainless steel, and 81.59% beryllium, the total amount of uranium in each of the fuel elements being approximately 828 grams; and a neutron reflector disposed about the core of the reactor, said reflector including means to vary the reflectivity thereof.

8. A neutronic reactor having a core consisting of a plurality of adjacent elongated regions of approximately equal volume having parallel equally spaced axes, a hollow tube disposed within each region coaxially about the axis thereof, a fuel element disposed within at least half of the tubes, the regions containing said fuel elements containing 8 to 10% uranium consisting of at least 75% $U^{235}$, 40 to 50% sodium, and not more than 10% beryllium, and neutron moderating elements disposed in the remaining tubes of the core, the regions containing neutron moderating elements containing at least 80% beryllium and between 10 and 15% sodium, said neutron moderating elements being essentially uniformly distributed throughout the core of the reactor.

9. A neutronic reactor comprising a core containing the elements of claim 4, a reflector disposed about the core, a neutron-absorbing region disposed about the reflector, and a shield disposed about the neutron absorbing region.

References Cited in the file of this patent

UNITED STATES PATENTS

| | | |
|---|---|---|
| 2,708,656 | Fermi et al. | May 17, 1955 |
| 2,780,596 | Anderson | Feb. 5, 1957 |

OTHER REFERENCES

Nucleonics, September 1952, pp. 11–13.
Nucleonics, June 1953, pp. 18–24.
Principles of Nuclear Reactor Engineering by Samuel Glasstone, D. Van Nostrand Co., N.Y., 1955, pp. 736, 737.